(12) United States Patent
Yoshino et al.

(10) Patent No.: US 8,722,774 B2
(45) Date of Patent: May 13, 2014

(54) BIODEGRADABLE RESIN COMPOSITION

(75) Inventors: Taiki Yoshino, Wakayama (JP); Akira Takenaka, Wakayama (JP); Keiko Fukaya, Wakayama (JP)

(73) Assignee: Kao Corporation, Tokyo (JP)

( * ) Notice: Subject to any disclaimer, the term of this patent is extended or adjusted under 35 U.S.C. 154(b) by 421 days.

(21) Appl. No.: 13/055,327

(22) PCT Filed: Jul. 21, 2009

(86) PCT No.: PCT/JP2009/063318
§ 371 (c)(1),
(2), (4) Date: Jan. 21, 2011

(87) PCT Pub. No.: WO2010/010961
PCT Pub. Date: Jan. 28, 2010

(65) Prior Publication Data
US 2011/0130488 A1    Jun. 2, 2011

(30) Foreign Application Priority Data

Jul. 22, 2008  (JP) ................................ 2008-188703
Apr. 21, 2009  (JP) ................................ 2009-103026

(51) Int. Cl.
C08G 18/38 (2006.01)
C08L 1/00 (2006.01)

(52) U.S. Cl.
USPC ....................................................... 524/35

(58) Field of Classification Search
USPC ............................................................ 524/35
See application file for complete search history.

(56) References Cited

U.S. PATENT DOCUMENTS

| | | | |
|---|---|---|---|
| 5,674,507 A | 10/1997 | Banker et al. | |
| 5,783,505 A * | 7/1998 | Duckett et al. | 442/411 |
| 6,103,790 A * | 8/2000 | Cavaille et al. | 524/13 |
| 6,869,985 B2 * | 3/2005 | Mohanty et al. | 523/124 |
| 7,256,223 B2 * | 8/2007 | Mohanty et al. | 523/124 |
| 7,988,905 B2 * | 8/2011 | Hashiba et al. | 264/331.21 |
| 2003/0083440 A1 | 5/2003 | Sashida et al. | |
| 2006/0093672 A1 * | 5/2006 | Kumar et al. | 424/472 |
| 2007/0032577 A1 * | 2/2007 | Kanzawa et al. | 524/31 |
| 2008/0118765 A1 | 5/2008 | Dorgan et al. | |
| 2008/0145656 A1 * | 6/2008 | Jung | 428/401 |
| 2008/0188636 A1 * | 8/2008 | Argyropoulos et al. | 527/300 |
| 2009/0093575 A1 | 4/2009 | Kabashima et al. | |
| 2009/0298976 A1 * | 12/2009 | Yano et al. | 524/35 |
| 2009/0306253 A1 * | 12/2009 | Hansen et al. | 524/35 |
| 2010/0063177 A1 | 3/2010 | Takenaka et al. | |
| 2010/0105891 A1 * | 4/2010 | Nojiri et al. | 536/124 |
| 2010/0125112 A1 * | 5/2010 | Chung et al. | 523/205 |
| 2010/0190891 A1 * | 7/2010 | Eichinger et al. | 524/35 |
| 2010/0240806 A1 * | 9/2010 | Kondo | 524/35 |
| 2011/0144241 A1 * | 6/2011 | Yoshino et al. | 524/35 |

FOREIGN PATENT DOCUMENTS

| | | | |
|---|---|---|---|
| CN | 101172164 A | | 5/2008 |
| EP | 0 654 492 A2 | | 5/1995 |
| EP | 0 654 492 A3 | | 5/1995 |
| JP | 11-241008 A | | 9/1999 |
| JP | 2003-73532 A | | 3/2003 |
| JP | 2004-143438 A | | 5/2004 |
| JP | 2004-359939 A | | 12/2004 |
| JP | 2005-23250 A | | 1/2005 |
| JP | 2005-146028 A | | 6/2005 |
| JP | 2006-36954 A | | 2/2006 |
| JP | 2007-100068 A | | 4/2007 |
| JP | 2007-130894 A | | 5/2007 |
| JP | 2007-138106 A | | 6/2007 |
| JP | 2007-164147 A | | 6/2007 |
| JP | 2007-186643 A | | 7/2007 |
| WO | WO 2005/003450 A1 | | 1/2005 |
| WO | WO 2005108501 A1 * | | 11/2005 |
| WO | WO 2007-015371 A1 | | 2/2007 |
| WO | WO 2007049666 A1 * | | 5/2007 |
| WO | WO 2007/136086 A1 | | 11/2007 |
| WO | WO 2008/044796 A1 | | 4/2008 |
| WO | WO 2008/075775 A1 | | 6/2008 |

OTHER PUBLICATIONS

Nagatani et al. (Journal of Applied Polymer Science, vol. 95, 144-148, 2005).*
Snow et al., Size Reduction and Size Enlargement, Perry, R.H.; Green, D.W. (1997). Perry's Chemical Engineers' Handbook (7th Edition). McGraw-Hill.*
Zhang et al., Cellulose, 2007, 14, 447-456.*
Mathew et al., Journal of Applied Polymer Science, vol. 101, 300-310, 2006.*
Pilla et al., Polymer Engineering and Science, Mar. 2008, 48, 3, 578-587.*
Notification of the First Office Action issued Apr. 26, 2012, in Chinese Patent Application No. 200980127156.3, with English translation.
Communication Pursuant to Article 94(3) EPC issued Oct. 2, 2012, in European Patent Application No. 09788003.3.
Office Action issued Aug. 29, 2013, in Japanese Patent Applcation No. 2010-231917.
International Search Report, dated May 1, 2010, issued in PCT/JP2009/063318.

* cited by examiner

*Primary Examiner* — Liam Heincer
(74) *Attorney, Agent, or Firm* — Birch, Stewart, Kolasch & Birch, LLP

(57) ABSTRACT

A biodegradable resin composition containing a biodegradable resin and a cellulose having a crystallinity of less than 50%; and a biodegradable resin molded article wherein the biodegradable resin composition as defined above is molded. The biodegradable resin composition can be suitably used for various industrial applications, such as daily sundries, household electric appliance parts, and automobile parts.

6 Claims, No Drawings

BIODEGRADABLE RESIN COMPOSITION

FIELD OF THE INVENTION

The present invention relates to a biodegradable resin composition. More specifically, the present invention relates to a biodegradable resin composition, which can be suitably used as daily sundries, household electric appliance parts, automobile parts, or the like, and a biodegradable resin molded article obtained by molding the composition.

BACKGROUND OF THE INVENTION

Among biodegradable resins, a polylactic acid resin is inexpensive because L-lactic acid used as a raw material is produced by a fermentation method using a sugar extracted from maize, potatoes, or the like. Also, the polylactic acid resin has a very low amount of a total carbon oxide discharge because the raw material is plant-derived, and the properties of the resin include strong rigidity and high transparency. Therefore, the utilization of polylactic acid resins is expected to be promising at present.

However, in addition to the properties mentioned above, since polylactic acid resin also has the properties of being brittle and hard, and lacking flexibility, its applications are limited, so that there are hardly any practical achievements in the fields of daily sundries, household electric appliance parts, automobile parts, and the like. In addition, when the resin is molded into an injection molded article or the like, there are some disadvantages such as mechanical strength such as flexibility or impact resistance is insufficient, and whitening upon bending or worsening of hinge properties takes place, so that the resin is not used at present.

In addition, the polylactic acid resin has a delayed crystallization velocity, and has an amorphous state after being injection-molded, so long as a mechanical processing such as stretching is not carried out. The polylactic acid resin has a low glass transition temperature (Tg) of 60° C., so that there is a disadvantage that the resin cannot be used under an environment condition of a temperature of 55° C. or higher.

Further, in order to utilize the polylactic acid resin in durable materials such as household electric appliance parts or automobile parts, aside from being provided with heat resistance and mechanical strength, the polylactic acid resin having a certain level of flexibility is in demand.

On the other hand, as a technique of applying a polylactic acid resin in hard field, various proposals of adding a reinforcing material have been made (see, for example, JP-A-2005-23250, JP-A-2007-100068, and WO 2007/015371).

SUMMARY OF THE INVENTION

Specifically, the present invention relates to:
[1] a biodegradable resin composition, containing a biodegradable resin and a cellulose having a crystallinity of less than 50%; and
[2] a biodegradable resin molded article, wherein the biodegradable resin composition as defined in the above [1] is molded.

MODES FOR CARRYING OUT THE INVENTION

According to the conventional techniques, it is made possible to improve heat resistance and mechanical strength of the polylactic acid resin. However, the effects are not sufficient, and a further development of a biodegradable resin composition having excellent heat resistance, mechanical strength, and flexibility is in demand.

In addition, it is effective to increase the crystallinity of a cellulose, from the viewpoint of improving the strength of a resin molded article (see WO 2007/015371). However, a resin molded article having high strength is disadvantageous in flexibility (flexural strain strength), so that it is required to satisfy both strength and flexibility (flexural strain strength).

On the other hand, it is pointed out that the polylactic acid resin is disadvantageous in costs, as compared to other widely used resins, due to a sudden rise in prices of raw materials in the recent years. In view of the above, although a technique of adding a filler is studied, it is considered that low costs and low levels of discharge of total carbon oxide are achieved by utilizing a biomass resource also for the filler.

As a result of intensive studies in order to solve the problems mentioned above, the present inventors have found that since a biodegradable resin composition contains a cellulose having a crystallinity of less than 50%, an excellent effect that a molded article obtained by molding the composition satisfies both strength and flexibility is exhibited. The present invention is perfected thereby.

The present invention relates to a biodegradable resin composition satisfying both strength and flexibility, and a biodegradable resin molded article obtained by molding the composition.

The biodegradable resin composition of the present invention exhibits an excellent effect that both strength and flexibility are satisfied. In addition, since a cellulose which is a biomass resource is contained as a filler, low costs and low levels of discharge of total carbon oxide is made possible.

These and other advantages of the present invention will be apparent from the following description.

The biodegradable resin composition of the present invention contains a biodegradable resin and a cellulose, and has a great feature in that the cellulose has a crystallinity of less than 50%. While a general resin contains an inorganic filler as a reinforcing material, in a biodegradable resin, a plant fiber such as a cellulose is used as a material having biodegradability in place of the inorganic filler. In the resin described above, a resin having high strength is obtained by further increasing a crystallinity of a cellulose which usually has a crystallinity of 80% or so. However, a resin having high strength is disadvantageous in flexibility, so that a further biodegradable resin satisfying both resin strength and flexibility is required. As a result of studies in view of the above, the present inventors have found that surprisingly a resin containing a cellulose having a crystallinity of less than 50% has excellent flexibility while having excellent strength. Although not wanting to be limited by theory, the reasons why are presumably due to the fact that the cellulose having a crystallinity of less than 50% has a low existing ratio of firm hydrogen bonding, so that interactions with the resin are increased, and at the same time the cellulose plays a role of a plasticizer. Here, the term "biodegradable or biodegradability" as used herein refers to a property capable of being degraded to low molecular compounds by microorganisms in nature. Specifically, the term means biodegradability based on "test on aerobic and ultimate biodegradation degree and disintegration degree under controlled aerobic compost conditions" of JIS K6953 (ISO 14855). In addition, the term "strength" as used herein means a property evaluated by "flexural strength" and "flexural modulus" described later, the term "flexibility" means a property evaluated by "flexural strain at break" described later, and the phrase "satisfying both strength and flexibility of the biodegradable resin composition" means satisfying both strength and flexibility of a molded article obtained by molding the composition.

<Biodegradable Resin Composition>
[Biodegradable Resin]

The biodegradable resin is not particularly limited so long as the resin has the above biodegradability. It is preferable that the biodegradable resin contains a polyester resin having the above biodegradability, from the viewpoint of improvement in strength by an interaction with a cellulose having a crystallinity of less than 50%.

The polyester resin having biodegradability includes aliphatic polyester resins such as polyhydroxy butyrate, polycaprolactone, polybutylene succinate, polybutylene succinate/adipate, polyethylene succinate, polylactic acid resin, polymalic acid, polyglycolic acid, polydioxanone, and poly(2-oxetanone); copolyester resins of an aliphatic polyester and an aromatic polyester, such as polybutylene succinate/terephthalate, polybutylene adipate/terephthalate, and polytetramethylene adipate/terephthalate; mixtures of a natural polymer, such as starch, cellulose, chitin, chitosan, gluten, gelatin, zein, soybean protein, collagen, or keratin, with the aliphatic polyester resin or the aliphatic aromatic copolyester resin mentioned above; and the like. Among them, the aliphatic polyester resins are preferred, from the viewpoint of processability, economic advantages, availability in large amounts, and the like, and the polylactic acid resin is more preferred, from the viewpoint of physical properties.

The polylactic acid resin contains a polylactic acid obtained by polycondensing lactic acid components alone as raw material monomers, and/or a polylactic acid obtained by polycondensing a lactic acid component and a hydroxycarboxylic acid component as raw material monomers.

Lactic acids exist in the form of optical isomers, L-lactic acid (L-form) and D-lactic acid (D-form). In the present invention, the lactic acid component may contain either one of the optical isomers or both, and it is preferable to use a lactic acid having high optical purity, which contains either one of the optical isomers as a main component, from the viewpoint of moldability. The term "main component" as used herein refers to a component that is contained in an amount of 50% by mol or more of the lactic acid component.

The L-form or D-form, in other words the form that is contained in a larger amount of the above isomers, is contained in an amount of preferably from 80 to 100% by mol, more preferably from 90 to 100% by mol, and even more preferably from 98 to 100% by mol, of the lactic acid component. Here, since it is preferable that the L-form and the D-form are contained in a total amount of substantially 100% by mol in the lactic acid component, the form that is contained in a smaller amount of the above isomers is contained in an amount of preferably from 0 to 20% by mol, and more preferably from 0 to 10% by mol, of the lactic acid component.

The L-form or D-form, in other words the form that is contained in a larger amount of the above isomers, is contained in an amount of preferably from 80 to 100% by mol, more preferably from 90 to 100% by mol, and even more preferably from 98 to 100% by mol, of the lactic acid component, in a case where the lactic acid components alone are polycondensed. Here, since the L-form and the D-form are contained in a total amount of substantially 100% by mol in the lactic acid component, the form that is contained in a smaller amount of the above isomers is contained in an amount of preferably from 0 to 20% by mol, more preferably from 0 to 10% by mol, and even more preferably from 0 to 2% by mol, of the lactic acid component.

The L-form or D-form, in other words the form that is contained in a larger amount of the above isomers, is contained in an amount of preferably from 85 to 100% by mol, and more preferably from 90 to 100% by mol, of the lactic acid component in a case where a lactic acid component and a hydroxycarboxylic acid component are polycondensed. Here, since the L-form and the D-form are contained in a total amount of substantially 100% by mol in the lactic acid component, the form that is contained in a smaller amount of the above isomers is contained in an amount of preferably from 0 to 15% by mol, and more preferably from 0 to 10% by mol, of the lactic acid component.

On the other hand, the hydroxycarboxylic acid component includes hydroxycarboxylic acid compounds such as glycolic acid, hydroxybutyric acid, hydroxyvaleric acid, hydroxypentanoic acid, hydroxycaproic acid, and hydroxyheptanoic acid, which may be used alone or in a combination of two or more kinds. Among them, glycolic acid and hydroxycaproic acid are preferred, from the viewpoint of satisfying both strength and flexibility of the biodegradable resin composition, and having heat resistance and transparency.

In addition, in the present invention, each of the lactic acid dimer and the dimer of the hydroxycarboxylic acid compound mentioned above may be contained in the respective component. The lactic acid dimer is exemplified by a lactide, which is a cyclic lactic acid dimer, and the dimer of the hydroxycarboxylic acid compound is exemplified by a glycolide, which is a cyclic glycolic acid dimer. Here, the lactides exist in the form of L-lactide, which is a cyclic L-lactic acid dimer; D-lactide, which is a cyclic D-lactic acid dimer; meso-lactide, which is a cyclic dimer of D-lactic acid and L-lactic acid; and DL-lactide, which is a racemic mixture of the D-lactide and the L-lactide. In the present invention, any one of the lactides can be used, and the D-lactide and the L-lactide are preferred, from the viewpoint of satisfying both strength and flexibility of the biodegradable resin composition, and having heat resistance and transparency. Here, the lactic acid dimer may be contained in either one of the lactic acid component in the embodiment where the lactic acid components alone are polycondensed, or the embodiment where the lactic acid component and the hydroxycarboxylic acid component are polycondensed.

The lactic acid dimer is contained in an amount of preferably from 80 to 100% by mol, and more preferably from 90 to 100% by mol, of the lactic acid component, from the viewpoint of satisfying both strength and flexibility of the biodegradable resin composition.

The dimer of the hydroxycarboxylic acid compound is contained in an amount of preferably from 80 to 100% by mol, and more preferably from 90 to 100% by mol, of the hydroxycarboxylic acid component, from the viewpoint of satisfying both strength and flexibility of the biodegradable resin composition.

The polycondensation reaction of the lactic acid components alone, and the polycondensation reaction of the lactic acid component and the hydroxycarboxylic acid component can be carried out, but not particularly limited to, using known methods.

Thus, the raw material monomers are selected, whereby a polylactic acid, for example, made from either component of L-lactic acid or D-lactic acid in an amount of 85% by mol or more and less than 100% by mol, and a hydroxycarboxylic acid component in an amount exceeding 0% by mol and 15% by mol or less, is obtained. Among them, a polylactic acid obtained by using a lactide, which is a cyclic lactic acid dimer, and a glycolide, which is a cyclic glycolic acid dimer, and caprolactone as raw material monomers is preferred.

In addition, in the present invention, as the polylactic acid, a stereocomplex polylactic acid, composed of two kinds of polylactic acids, each obtained from a lactic acid component containing an isomer different from one another as a main component, may be used, from the viewpoint of satisfying both strength and flexibility of the biodegradable resin composition, and having heat resistance and transparency.

One polylactic acid constituting the stereocomplex polylactic acid [hereinafter referred to as "polylactic acid (A)"] contains the L-form in an amount of from 90 to 100% by mol, and other component including the D-form in an amount of from 0 to 10% by mol. The other polylactic acid [hereinafter referred to as "polylactic acid (B)"] contains the D-form in an amount of from 90 to 100% by mol, and other component including the L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40.

It is desired that the polylactic acid is contained in the polylactic acid resin in an amount of preferably 80% by weight or more, more preferably 90% by weight or more, and even more preferably substantially 100% by weight.

Here, the polylactic acid resin can be synthesized according to the above method, and commercially available products include, for example, "LACEA Series" (commercially available from Mitsui Chemicals, Inc.), such as LACEA H-100, H-280, H-400, and H-440; "Nature Works" (commercially available from Nature Works), such as 3001D, 3051D, 4032D, 4042D, 6201D, 6251D, 7000D, and 7032D; and "Ecoplastic U'z Series" (commercially available from TOYOTA MOTOR CORPORATION), such as Ecoplastic U'z S-09, S-12, and S-17. Among them, LACEA H-100, H-280, H-400, H-440 (commercially available from Mitsui Chemicals, Inc.), 3001D, 3051D, 4032D, 4042D, 6201D, 6251D, 7000D, and 7032D (commercially available from Nature Works), and Ecoplastic U'z S-09, S-12, and S-17 (commercially available from TOYOTA MOTOR CORPORATION) are preferred.

The biodegradable resin may properly contain, besides the above polylactic acid resin, other biodegradable resins within the range that would not impair the effects of the present invention. Other biodegradable resins include the above polyester resin having biodegradability, such as polybutylene succinate, a polyhydroxyalkanoic acid, and the like. In addition, the above polylactic acid resin may be contained in the form of a polymer alloy of a blend of the polylactic acid resin with the above other biodegradable resin or a non-biodegradable resin, such as polypropylene. The above polylactic acid resin is contained in an amount of, but not particularly limited to, preferably 50% by weight or more, more preferably 80% by weight or more, and even more preferably 90% by weight or more, of the biodegradable resin, from the viewpoint of satisfying both strength and flexibility of the biodegradable resin composition, and having heat resistance and productivity.

The biodegradable resin is contained in an amount of preferably 50% by weight or more, more preferably 60% by weight or more, and even more preferably 70% by weight or more, of the biodegradable resin composition.

[Cellulose]

The cellulose usable in the present invention is a cellulose having a crystallinity of less than 50%.

The crystallinity of the cellulose as used herein is a cellulose I crystallinity calculated according to Segal method from diffraction intensity values according to X-ray diffraction method, which is defined by the following formula (1):

$$\text{Cellulose } I \text{ Crystallinity } (\%) = [(I22.6 - I18.5)/I22.6] \times 100 \quad (1)$$

wherein I22.6 is a diffraction intensity of a lattice face (face 002) (angle of diffraction 2θ=22.6°), and I18.5 is a diffraction intensity of an amorphous portion (angle of diffraction 2θ=18.5°), in X-ray diffraction analysis. Here, the cellulose I crystallinity means a ratio of the amount of crystalline region that occupies the entire cellulose. Therefore, it can be seen that a cellulose having a cellulose I crystallinity of less than 50% is a cellulose having an amount of crystalline region of less than 50%, i.e. a cellulose containing an amorphous portion exceeding 50%. In the present specification, the cellulose containing an amorphous portion exceeding 50% as mentioned above may be referred to as an amorphous cellulose, and a cellulose containing an amount of crystalline region of 50% or more may be referred to as a crystalline cellulose. Here, cellulose I is a crystalline form of a natural cellulose, and the cellulose I crystallinity is also related to physical properties and chemical properties of the cellulose; the larger the crystallinity, the more increased the hardness, density, or the like, but the more lowered the elongation, the flexibility, or the chemical reactivity.

The cellulose usable in the present invention has a crystallinity of less than 50%. The cellulose has a crystallinity of preferably 30% or less, more preferably 10% or less, and even more preferably substantially 0% at which the crystal I is not detected in the X-ray diffraction analysis, from the viewpoint of satisfying both strength and flexibility of the biodegradable resin composition. In the cellulose I crystallinity defined by the formula (1), there are some cases that take a minus value in the calculation, and in a case of a minus value, the cellulose I crystallinity is assumed to be 0%. In addition, in the present invention, two or more kinds of celluloses having different crystallinities may be used in combination, and the crystallinity of the cellulose in that case means a crystallinity obtained by a weighed average of the used celluloses, and it is preferable that the crystallinity is within the above range.

The cellulose is not particularly limited so long as the cellulose has a crystallinity of less than 50%. For example, it is preferable that the cellulose is a cellulose obtained or obtainable by subjecting a cellulose-containing raw material to a mechanical treatment described below, or the like.

The cellulose-containing raw material is not particularly limited, and various parts of plants, such as body, branches, leaves, stems, roots, seeds, and fruits, including, for example, plant stems and leaves such as rice plant straw and maize stems; plant husks such as rice hulls, palm husks, and coconut husks; and the like, can be used. In addition, pulp such as wood pulp produced from lumbers from thinning, pruned branches, various wood chips and wood, and cotton linter pulp obtained from surrounding fiber of cottonseeds; paper such as newspaper, corrugated cardboards, magazines, and high-quality paper may be used, and the pulp is preferred, from the viewpoint of obtaining a biodegradable resin molded article having a reduced color. In addition, a commercially available crystalline cellulose can be used as a cellulose-containing raw material. The commercially available crystalline celluloses are KC FLOCK (commercially available from NIPPON PAPER CHEMICALS CO., LTD.), Ceolus (commercially available from ASAHI KASEI CHEMICALS CORPORATION), and the like. The form of these cellulose-containing raw materials is not particularly limited, and the raw materials in various forms such as chips and sheets can be used. Here, a commercially available pulp has a cellulose I crystallinity of usually 80% or more, and a commercially available crystalline cellulose has a cellulose I crystallinity of usually 80% or more.

It is desired that the above cellulose-containing raw material contains the cellulose in an amount of preferably 20% by weight or more, more preferably 40% by weight or more, and even more preferably 60% by weight or more, of the residual component obtained by removing water from the raw material. For example, a commercially available pulp contains the cellulose in an amount of usually from 75 to 99% by weight, of the residual component obtained by removing water from the raw material, and lignin or the like is contained as other component. Here, a method of removing water from the raw material is not particularly limited, and the method can be carried out by, for example, vacuum drying or drying with a dry air. The above amount of cellulose contained as used herein means a total amount of a cellulose amount and a hemicellulose amount.

In addition, in a case where the pulp is used as a cellulose-containing raw material, it is desired that lignin is contained in an amount of preferably 15% by weight or less, more preferably 10% by weight or less, and even more preferably 8% by weight or less, of the cellulose-containing raw material, from the viewpoint of improving impact resistance of the biodegradable resin molded article.

A method of reducing lignin includes, for example, an alkali cooking method described in JP-A-2008-92910, a sulfuric acid degradation method described in JP-A-2005-229821, and the like.

The alkali cooking (also simply referred to as cooking) method includes a soda method or a Kraft method.

The soda method is a method of removing lignin using an alkalizing agent, such as sodium hydroxide, potassium hydroxide, or sodium carbonate.

The Kraft method is a method of removing lignin by using an alkalizing agent such as sodium hydroxide, potassium hydroxide, or sodium carbonate, together with a sulfur-containing agent such as sodium sulfide or sodium sulfite.

It is preferable that the alkalizing agent is added in an amount of from 5 to 40% by weight of the weight of the cellulose-containing raw material subjected to cooking on a dry basis.

In addition, in the alkali cooking, besides the above alkalizing agent, a quinone cooking aid, oxygen, hydrogen peroxide, or a polysulfide can be used as an additive. These additives can be used depending upon the properties or the amount of lignin contained. In a case where the cooking can be carried with the alkalizing agent alone, these additives do not have to be used. When added, it is preferable that the additive is added in an amount of 10% by weight or less of the weight of the cellulose-containing raw material subjected to cooking.

The cellulose-containing raw material subjected to the alkali cooking may be previously pulverized, or cut or disintegrated into the form of chips and used, in order to facilitate the progress of cooking. It is desired that the cellulose-containing raw material upon the alkali cooking has a concentration in the cooking mixture of from 5 to 50% by weight, that the reaction temperature is from 100° to 200° C., and preferably from 140° to 200° C., and that the heating time is from 60 to 500 minutes. The above conditions can be modified according to the shapes and dimensions of the chips, and the properties and amount of lignin contained.

Water is contained in an amount of preferably 20% by weight or less, more preferably 15% by weight or less, and even more preferably 10% by weight or less, of the cellulose-containing raw material. If water is contained in an amount of 20% by weight or less of the cellulose-containing raw material, the raw material can be easily pulverized and at the same time the crystallinity can be easily lowered by a mechanical treatment.

The mechanical treatment refers to a pulverization treatment of the cellulose-containing raw material, and by the treatment, the crystallinity of the cellulose is lowered, so that amorphous phases can be efficiently formed. Here, a cellulose-containing raw material of which bulk density and average particle size are adjusted may be subjected to a pulverization treatment, from the viewpoint of lowering the crystallinity efficiently, or the cellulose-containing raw material of which amount of water contained is adjusted may be subjected to a pulverization treatment, from the viewpoint of durability of the biodegradable resin molded article.

(Method for Preparing Cellulose-Containing Raw Material of Which Bulk Density and Average Particle Size Are Adjusted)

The method of adjusting a bulk density and an average particle size of the cellulose-containing raw material is not particularly limited. The method is preferably a method of pulverizing the raw material while allowing a compressive shearing force to act, from the viewpoint of breaking a crystalline structure of the cellulose to form a powder. Here, in the subsequent description, the pulverization for adjusting a bulk density and an average particle size of a cellulose-containing raw material while allowing a compressive shearing force to act is referred to as a primary pulverization, and the pulverization for subjecting the cellulose-containing raw material obtained in the primary pulverization, or the cellulose-containing raw material of which amount of water contained is adjusted, to formation of amorphous phases is referred to as a secondary pulverization.

Before the primary pulverization, it is preferable that a cellulose-containing raw material is roughly pulverized into the form of chips or rectangular parallelepipeds. The cellulose-containing raw material in the form of chips has a size of preferably of from 1 to 50 mm each side, and more preferably from 1 to 30 mm each side. By roughly pulverizing the raw material into the form of chips of from 1 to 50 mm each side, the primary pulverization can be efficiently and easily carried out. Here, the size of the cellulose-containing raw material after the rough pulverization can be measured using calipers.

The method for rough pulverization includes a method using a cutting machine, such as a shredder, a rotary cutter, or a slitter-cutter. In a case where a rotary cutter is used, the size of the cellulose-containing raw material obtained in the form of chips can be controlled by changing a sieve opening of a screen (sieve). The screen has a sieve opening of preferably from 1 to 50 mm, and more preferably from 1 to 30 mm. If the screen has a sieve opening of 1 mm or more, the handling property is improved because the cellulose-containing raw material does not become flocculent, so that the cellulose-containing raw material used in the subsequent primary pulverization has an appropriate bulk density. If the screen has a sieve opening of 50 mm or less, the load in the primary pulverization can be reduced because the raw material has a size appropriate for the cellulose-containing raw material to be subjected to the subsequent primary pulverization.

In addition, in a case where a cellulose-containing raw material in a sheet-like form is used, a shredder or a slitter-cutter is preferably used, and a slitter-cutter is more preferably used, from the viewpoint of productivity.

Using the slitter-cutter, a cellulose-containing raw material in a sheet-like form is cut lengthwise with a roller cutter in a length direction along the length direction of the sheet to form thin strips of rectangular pieces, and thereafter cut widthwise shorter along a width direction of the sheet with a fixed blade and a rotary blade, whereby a cellulose-containing raw material in the a rectangular parallelepiped form can be easily obtained. As the slitter-cutter, Sheet Pelletizer commercially available from HORAI Co., Ltd. can be preferably used, and a cellulose-containing raw material in a sheet-like form can be roughly pulverized to pieces having about 1 to about 20 mm each side by using this apparatus.

The method of mechanically pulverizing a cellulose-containing raw material while allowing a compressive shearing force to act, in other words, the method for a primary pulverization, includes a method of pulverizing the raw material with a conventionally well used impact type pulverizer, for example, a cutter mill, a hammer-mill, a pin mill, or the like, or an extruder. The method using an extruder is preferred because the cellulose-containing raw material is less likely to be flocculent and to be bulky, so that a cellulose-containing raw material having desired bulk density and average particle size is obtained, whereby the handling property is improved.

The extruder may be in any of the forms of single-screw and twin-screw extruders, and the twin-screw extruder is preferred, from the viewpoint of increasing the transportation capacity, or the like.

As the twin-screw extruder, an extruder in which two screws are inserted into the internal of the cylinder in a free rotation, and a conventionally known one can be used. The rotational direction of the two screws may be the same or opposite directions, and the rotation in the same direction is preferred, from the viewpoint of increasing transportation ability. In addition, as the engaging conditions of the screws, extruders of any forms of perfectly engaging, partially engaging, and non-engaging extruders may be used, and the perfectly engaging and partially engaging extruders are preferred, from the viewpoint of improving the treatment ability.

As an extruder, it is preferable that the extruder is provided with a so-called kneading disc member in any parts of the screw, from the viewpoint of applying a strong compressive shearing force.

The kneading disc member comprises plural kneading discs, and these kneading discs are combined while consecutively shifting the discs at a constant phase, for example, 90° each, and a very strong shearing force can be applied to the cellulose-containing raw material forcibly passing through the narrow gap together with the rotations of the screw. It is preferable that the screw has a constitution that a kneading disc member and plural screw segments are alternately arranged. In a case of a twin-screw extruder, it is preferable that two screws have the same constitution.

It is preferable that the method of treatment is a method including the steps of supplying into an extruder a cellulose-containing raw material, preferably the above cellulose-containing raw material in the form of chips, and continuously treating the raw material. The shearing rate is preferably 10 $sec^{-1}$ or more, more preferably from 20 to 30000 $sec^{-1}$, and even more preferably from 50 to 3000 $sec^{-1}$. If the shearing rate is 10 $sec^{-1}$ or more, high densification is effectively progressed. Other treatment conditions are not particularly limited, and a treatment temperature is preferably from 5° to 200° C.

In addition, as the number of passes of the raw material through the extruder, a sufficient effect can be obtained even in a single pass; however, if a single pass is insufficient, it is preferable to perform two or more passes, from the viewpoint of highly densifying the cellulose-containing raw material. In addition, 1 to 10 passes are preferred, from the viewpoint of productivity. By repeating the number of passes, coarse particles are pulverized, so that a powdery cellulose-containing raw material having a smaller variance in particle sizes can be obtained. In a case where two or more passes are performed, plural extruders may be serially arranged for performing the treatment, from the viewpoint of production ability.

According to the above primary pulverization, a cellulose-containing raw material of which bulk density and average particle size are adjusted (hereinafter also referred to as "cellulose-containing raw material obtained by the primary pulverization," or "cellulose-containing raw material after the primary pulverization") can be obtained. Here, the cellulose is contained in an amount that does not fluctuate by the primary pulverization, and the cellulose is contained in an amount of preferably 20% by weight or more, more preferably 40% by weight or more, and even more preferably 60% by weight or more, of the residual component obtained by removing water from the raw material after the primary pulverization.

The cellulose-containing raw material after the primary pulverization has a bulk density of preferably 100 kg/m$^3$ or more, more preferably 120 kg/m$^3$ or more, and even more preferably 150 kg/m$^3$ or more. If the raw material has a bulk density of 100 kg/m$^3$ or more, the handling property is improved because the cellulose-containing raw material has an appropriate volume. In addition, the treatment ability is improved because the amount of the raw material fed to a pulverizer used in the secondary pulverization can be increased. On the other hand, the raw material has an upper limit of this bulk density of preferably 500 kg/m$^3$ or less, more preferably 400 kg/m$^3$ or less, and even more preferably 350 kg/m$^3$ or less, from the viewpoint of handling property and productivity. From these viewpoints, the raw material has a bulk density of preferably from 100 to 500 kg/m$^3$, more preferably from 120 to 400 kg/m$^3$, and even more preferably from 150 to 350 kg/m$^3$. Here, the bulk density of the cellulose-containing raw material as used herein can be measured in accordance with a method described in Examples set forth below.

In addition, the cellulose-containing raw material after the primary pulverization has an average particle size of preferably 1.0 mm or less, more preferably 0.7 mm or less, and even more preferably 0.5 mm or less. If the raw material has an average particle size of 1.0 mm or less, the cellulose-containing raw material can be efficiently dispersed in a pulverizer upon feeding the raw material to a pulverizer used in the secondary pulverization, so that the raw material can reach a given particle size without requiring a long period of time. On the other hand, the raw material has a lower limit of the average particle size of preferably 0.01 mm or more, and more preferably 0.05 mm or more, from the viewpoint of productivity. From these viewpoints, the raw material has an average particle size of preferably from 0.01 to 1.0 mm, and more preferably from 0.01 to 0.7 mm, and even more preferably from 0.05 to 0.5 mm. Here, the average particle size of the cellulose-containing raw material after the primary pulverization can be measured in accordance with a method described in Examples set forth below. In addition, water is contained in the cellulose-containing raw material after the primary pulverization in an amount of preferably exceeding 4.5% by weight, and preferably 10% by weight or less.

(Method for Producing Cellulose-Containing Raw Material of which Amount of Water Contained is Adjusted)

On the other hand, as the method of adjusting an amount of water contained in the cellulose-containing raw material, the treatment method is not particularly limited, so long as the method includes the step of carrying out a drying process, and a known drying method may be appropriately selected. The drying method includes, for example, a hot blast drying method, a thermal conductive drying method, a dehumidified air drying method, a cold air drying method, a microwave drying method, an infrared drying method, a solar drying method, a vacuum drying method, a freeze-drying method, and the like. These drying methods may be carried out alone or in a combination of two or more kinds. In addition, the drying process can be any of batch processes and continuous processes.

In the above drying method, a known dryer can be appropriately selected and used, and the dryer includes, for example, a dryer described on page 176 of "*Funtai Kogaku Gairon (Introduction to Powder Engineering)*" (edited by Association of Powder Process Industry and Engineering JAPAN, Powder Engineering Information Center, published 1995), and the like. The dryers may be used alone or in a combination of two or more kinds.

The temperature in the drying treatment cannot be unconditionally determined because the temperature varies depending upon a drying means, drying time, or the like. The temperature is preferably from 10° to 250° C., more preferably from 50° to 150° C., and even more preferably from 60° to 120° C. The treatment time is preferably from 0.01 to 2 hr, and more preferably from 0.02 to 1 hr. The drying treatment may be carried out under a reduced pressure, as occasion demands, and the pressure is preferably from 1 to 120 kPa, and more preferably from 50 to 105 kPa.

In addition, prior to the drying treatment, it is preferable that the cellulose-containing raw material is previously roughly pulverized into the forms of chips or rectangular parallelepipeds. The size of the roughly pulverized cellulose-containing raw material is such that those in the form of chips have a size of preferably of from 1 to 50 mm each side, and more preferably from 1 to 30 mm each side, and those in the form of rectangular parallelepipeds have a size of preferably from 1 to 20 mm each side. By roughly pulverizing the raw material to the size mentioned above, the drying treatment and the secondary pulverization can be efficiently and easily carried out. Here, the method for rough pulverization include the same methods as those of the rough pulverization treatment before the primary pulverization of the cellulose-containing raw material.

Here, a generally utilizable cellulose-containing raw material, such as commercially available pulp, or those utilized as biomass resources, such as paper, wood, plant stems and leaves, and plant husks, contains water in an amount of 5% by weight or more, and usually from about 5 to about 30% by weight.

Therefore, the water is contained in the cellulose-containing raw material that is subjected to the drying treatment in the present invention in an amount of preferably 4.5% by weight or less, more preferably 4.3% by weight or less, even more preferably 4.0% by weight or less, even more preferably 3.5% by weight or less, and even more preferably 3.0% by weight or less. It is preferable that the water is contained in an amount of 4.5% by weight or less, from the viewpoint of being capable of easily subjecting the cellulose-containing raw material to the secondary pulverization, and durability of the biodegradable resin molded article. On the other hand, the water is contained in an amount as a lower limit of preferably 0.2% by weight or more, more preferably 0.3% by weight or more, even more preferably 0.4% by weight or more, and even more preferably 0.6% by weight or more, from the viewpoint of productivity of the secondary pulverization and drying efficiency. From the above viewpoint, the water is contained in an amount of preferably from 0.2 to 4.3% by weight, more preferably from 0.3 to 4.0% by weight, even more preferably from 0.4 to 3.5% by weight, and even more preferably from 0.6 to 3.0% by weight, of the cellulose-containing raw material that is subjected to the dry treatment and to be subjected to the secondary pulverization.

In addition, the cellulose-containing raw material of which amount of water contained is adjusted has a bulk density of the same level as the bulk density of the above cellulose raw material after the primary pulverization.

Further, the above cellulose-containing raw material of which amount of water contained is adjusted has an average particle size of preferably exceeding 1.0 mm and 50.0 mm or less, and more preferably exceeding 2.0 mm and 50.0 mm or less. Here, the average particle size of the above cellulose-containing raw material of which amount of water contained is adjusted can be measured in accordance with the methods described in Examples set forth below.

Next, the cellulose-containing raw material obtained by the above primary pulverization or the above drying treatment is subjected to a secondary pulverization in order to make the raw material amorphous.

As a pulverizer used in the secondary pulverization (hereinafter, also referred to as a "pulverizer A"), a medium pulverizer is preferred. The medium pulverizer includes a rotary driving pulverizer and a medium agitating pulverizer. The rotary driving pulverizer includes a tumbling mill, a vibration mill, a planet mill, a centrifugal fluidized mill, and the like. Among them, a vibration mill is preferred, from the viewpoint of high pulverization efficiency and productivity. The medium agitating pulverizer includes tower pulverizers such as tower mills; agitating pulverizers such as attritors, Aqua-Mizer, and sand grinder; plug flow reaction vessel pulverizers such as VISCO MILL and Pearl Mill; plug flow reaction tube pulverizers; annular pulverizers, such as co-ball mills; continuous dynamic pulverizers; and the like. Among them, the agitating pulverizer is preferred, from the viewpoint of high pulverization efficiency and productivity. The peripheral speed of the tip end of the agitation blades in a case where a medium agitating pulverizer is used is preferably from 0.5 to 20 m/s, and more preferably from 1 to 15 m/s. Here, the kinds of the pulverizers can be referred to in "*Kagakukogakuno Shinpo Dai* 30 *Shu Biryushi Seigyo (Advancement of Chemical Engineering Vol.* 30 *Fine Particle Control)*" (edited by Tokai Branch, The Society of Chemical Engineers, Japan, published Oct. 10, 1996, published by Maki Shoten). Also, the method for treatment may be in either a batch process or a continuous process.

The material for the medium of the pulverizer includes, but not particularly limited to, for example, iron, stainless, alumina, zirconia, silicon carbide, silicon nitride, glass, and the like. The shape of the medium is not particularly limited, and includes balls, rods, tubes, and the like. Here, a rod is a bar-shaped medium, and those rods having a cross section of a polygonal such as a tetragonal or a hexagonal, a circle, an ellipse, or the like can be used.

In a case where a pulverizer A is a vibration mill and a medium is a rod, the rod has an outer diameter of preferably from 0.5 to 200 mm, more preferably from 1.0 to 100 mm, and even more preferably from 5 to 50 mm. If the rod has a size within the above range, a desired pulverization force is obtained, and at the same time the cellulose can be efficiently made amorphous without soiling the cellulose-containing raw material by admixture of fragments or the like of a rod.

The filling ratio of the rod takes different preferred filling ratios depending upon the models of the rotary driving pulverizers, and the filling ratio is preferably within the range of from 10 to 70%, and more preferably within the range of from 15 to 60%. If the filling ratio is within this range, the contact frequency of the cellulose-containing raw material with the rod increases, and whereby pulverization efficiency can be improved. Here, the filling ratio refers to a ratio of an apparent volume of a rod to a volume of an agitation member of a rotary driving pulverizer. In addition, it is preferable that plural rods are used, from the viewpoint of increasing the contact frequency of the cellulose-containing raw material with the rod, whereby improving pulverization efficiency.

In a case where the pulverizer A is an agitating pulverizer and the medium is a ball, the ball has an outer diameter of preferably within the range of from 0.1 to 100 mm, and more preferably within the range of from 0.5 to 50 mm. If the size of the ball is within the above range, a desired pulverization force is obtained, and at the same time the cellulose can be efficiently made amorphous without soiling the cellulose-containing raw material by admixture of fragments or the like of a ball.

The filling ratio of the ball takes different preferred filling ratios depending upon the models of the agitating pulverizers, and the filling ratio is preferably within the range of from 10 to 97%, and more preferably within the range of from 15 to 95%. If the filling ratio is within this range, the contact frequency of the cellulose-containing raw material with the ball increases, and at the same time the pulverization efficiency can be improved without hindering the movements of the medium. Here, the filling ratio refers to a ratio of an apparent volume of a ball to a volume of an agitation member of an agitating pulverizer.

The treatment time cannot be unconditionally determined because the treatment time varies depending upon the kinds of pulverizers, kinds, sizes and filling ratios of media, and the like. The treatment time is preferably from 0.01 to 50 hr, more preferably from 0.05 to 20 hr, even more preferably from 0.10 to 10 hr, and even more preferably from 0.10 to 5 hr, from the viewpoint of lowering a crystallinity. The treatment temperature is not particularly limited, and the treatment temperature is preferably from 5° to 250° C., and more preferably from 10° to 200° C., from the viewpoint of preventing degradation due to heat.

Thus, a cellulose having a crystallinity of less than 50% is obtained.

The cellulose thus obtained is made amorphous to have a crystallinity of less than 50%, and the cellulose has an average particle size of preferably 150 μm or less, more preferably 50 μm or less, and even more preferably 30 μm or less, from the viewpoint of satisfying both strength and flexibility of the biodegradable resin composition, and having handling property. In addition, it is preferable that the cellulose has an average particle size of 100 nm or more, from the viewpoint of satisfying both strength and flexibility of the biodegradable resin composition caused by an interaction with the plasticizer. Therefore, the cellulose obtained by the above secondary pulverization may be properly subjected to a classifying step, a sieving step, and the like to adjust a particle size. Here, the average particle size of the cellulose can be measured in accordance with a method described in Examples set forth below.

In addition, in the present invention, it is preferable that the cellulose contained in the resin composition is obtained or obtainable by subjecting a cellulose having a crystallinity of less than 50% to a treatment of forming smaller particle sizes so as to have an average particle size of 30 μm or less, from the viewpoint of further improving flexibility and impact resistance while maintaining the strength of the molded article obtained.

The method for treatment of forming smaller particle sizes includes a method including the steps of adding a pulverization aid to a cellulose of which crystallinity is adjusted to less than 50%, and subjecting the mixture to a pulverization treatment (hereinafter referred to as tertiary pulverization) with a pulverizer. The cellulose used in the tertiary pulverization is not particularly limited, so long as the crystallinity is adjusted to less than 50%. It is preferable that the cellulose is a cellulose of which crystallinity is adjusted to less than 50% by the above mechanical treatment. Therefore, it is preferable that the cellulose having a crystallinity of less than 50% contained in the composition of the present invention is a cellulose obtained or obtainable by further adding a pulverization aid to the cellulose obtained by the above mechanical treatment, in other words, to the cellulose obtained by the treatment with a pulverizer A, and subjecting the mixture to a pulverization treatment.

The pulverizer used in the tertiary pulverization (hereinafter also referred to as a pulverizer B) is preferably a medium pulverizer, and the same ones as preferred pulverizers in the secondary pulverization (pulverizer A) are exemplified. Here, the pulverizer A and the pulverizer B may be the same pulverizer or different pulverizers.

The material for the medium of the pulverizer includes, but not particularly limited to, for example, iron, stainless steel, alumina, zirconia, silicon carbide, silicon nitride, glass, and the like. The shape of the medium includes, but not particularly limited to, balls, rods, tubes, and the like. It is preferable that the pulverizer B is a vibration mill filled with rods, from the viewpoint of the efficiency of forming fine particles of the cellulose.

The rod has an outer diameter of preferably from 0.5 to 200 mm, more preferably from 1 to 100 mm, and even more preferably from 5 to 50 mm. The length of the rod is not particularly limited, so long as the length of the rod is shorter than the length of the rotary vessel of the pulverizer. If the size of the rod is within the above range, the desired pulverization force is obtained, so that the average particle size of the cellulose can be efficiently reduced. The filling ratio of the rod is the same as mentioned above.

The pulverization aid usable in the tertiary pulverization includes alcohols, aliphatic amides, aromatic carboxylic acid amides, rosin amides, metal salts of fatty acids, metal salts of dialkyl esters of aromatic sulfonic acids, metal salts of phenylphosphonic acids, metal salts of phosphoric esters, metal salts of rosin acids, fatty acid esters, carbohydrazides, N-substituted ureas, salts of melamine compounds, urasils, and polyethers, from the viewpoint of accelerating adsorption to the cellulose due to an interaction with a hydroxyl group of the cellulose. Among them, at least one member selected from the group consisting of alcohols, aliphatic amides, aromatic carboxylic acid amides, metal salts of fatty acids, metal salts of phenylphosphonic acids, metal salts of phosphoric esters, fatty acid esters, and polyethers is preferred, from the viewpoint of thermal stability of the biodegradable resin composition. At least one member selected from the group consisting of alcohols, aliphatic amides, metal salts of fatty acids, metal salts of phenylphosphonic acids, fatty acid esters, and polyethers is more preferred, from the viewpoint of improving pulverization efficiency of the cellulose and impact resistance of the biodegradable resin molded article.

It is preferable that the alcohol usable in the pulverization aid is a linear or branched alcohol having preferably from 5 to 40 carbon atoms, more preferably from 10 to 30 carbon atoms, and even more preferably from 14 to 22 carbon atoms, from the viewpoint of inhibiting aggregation and reducing the average particle size of the cellulose. In addition, the alcohol may have a substituent such as an aldehyde group, a carbonyl group, an amino group, an amide group, an imino group, an imide group, a cyano group, a thiol group, an ester group, or an ether group, from the viewpoint of an interaction with a hydroxyl group of the cellulose for accelerating adsorption to the cellulose.

The above alcohol includes lauryl alcohol, myristyl alcohol, cetyl alcohol, stearyl alcohol, behenyl alcohol, cetostearyl alcohol, 2-octyldodecanol, and the like. Among them, myristyl alcohol, stearyl alcohol, behenyl alcohol, and the like are preferred, from the viewpoint of improving pulverization efficiency of the cellulose and impact resistance of the biodegradable resin molded article.

As the aliphatic amide usable in the pulverization aid, the aliphatic amide may have a substituent such as an aldehyde group, a carbonyl group, an amino group, an imino group, an imide group, a cyano group, a thiol group, an ester group, or an ether group, from the viewpoint of an interaction with a hydroxyl group in the cellulose for accelerating adsorption to the cellulose.

Specific examples of the above aliphatic amide compounds include 12-hydroxystearic acid monoethanolamide, ethylenebis lauric acid amide, ethylenebis capric acid amide, ethylenebis caprylic acid amide, methylenebis 12-hydroxystearic amide, ethylenebis 12-hydroxystearic amide, hexamethylenebis 12-hydroxystearic amide, and the like. Among them, an alkylenebis hydroxyfatty acid amide, such as methylenebis 12-hydroxystearic amide, ethylenebis 12-hydroxystearic amide, or hexamethylenebis 12-hydroxystearic amide is preferred, and ethylenebis 12-hydroxystearic amide is more preferred, from the viewpoint of improving pulverization efficiency of the cellulose and impact resistance of the biodegradable resin molded article.

It is preferable that the metal salt of a fatty acid usable in the pulverization aid is a metal salt of a fatty acid having preferably from 12 to 24 carbon atoms, more preferably from 14 to 20 carbon atoms, from the viewpoint of inhibiting aggregation and reducing an average particle size of the cellulose. The fatty acid moiety may have a substituent such as an aldehyde group, a carbonyl group, an amino group, an amide group, an imino group, an imide group, a cyano group, a thiol group, an ester group, or an ether group, from the viewpoint of an interaction with a hydroxyl group in the cellulose for accelerating adsorption to the cellulose.

The above metal salt of a fatty acid includes sodium salts, potassium salts, calcium salts, magnesium salts, and the like of capric acid, lauric acid, myristic acid, palmitic acid, stearic acid, behenic acid, and the like. Among them, sodium myristate and sodium stearate are preferred, from the viewpoint of improving pulverization efficiency of the cellulose and impact resistance of the biodegradable resin molded article.

The metal salt of a phenylphosphonic acid usable in the pulverization aid is a metal salt of a phenylphosphonic acid having a phenyl group which may have a substituent and a phosphonic group [—PO(OH)$_2$], wherein the substituent for the phenyl group includes an alkyl group having from 1 to 10 carbon atoms, an alkoxycarbonyl group of which alkoxy group has from 1 to 10 carbon atoms, and the like. Specific examples of the phenylphosphonic acid include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The metal salt of a phenylphosphonic acid includes salts of lithium, sodium, magnesium, aluminum, potassium, calcium, barium, copper, zinc, iron, cobalt, nickel, and the like. The zinc salt is preferred, from the viewpoint of improving impact resistance of the biodegradable resin molded article.

It is preferable that the fatty acid ester usable in the pulverization aid is a compound represented by the following general formula (1):

$$R^1COOR^2 \quad (1)$$

wherein it is preferable that $R^1$ and $R^2$ are such that, but not particularly limited to, $R^1$ is a linear or branched, alkyl group, alkenyl group, hydroxyalkyl group, or alkyl ether group having preferably from 1 to 50 carbon atoms, more preferably from 1 to 40 carbon atoms, and even more preferably from 2 to 30 carbon atoms, and that $R^2$ is an alkyl group, an alkenyl group, an ether group, an alkyl ether group, or an alkyl group containing a hydroxyl group, a residue obtained by removing one acyloxy group from glyceride, or an alkyleneoxy group, each having preferably from 1 to 50 carbon atoms, more preferably from 1 to 30 carbon atoms, and even more preferably from 2 to 20 carbon atoms, from the viewpoint of improving impact resistance of the biodegradable resin molded article.

In addition, the fatty acid ester may have a substituent such as an aldehyde group, a carbonyl group, an amino group, an amide group, an imino group, an imide group, a cyano group, a thiol group, or an ether group, from the viewpoint of an interaction with a hydroxyl group in the cellulose for accelerating adsorption to the cellulose.

The above fatty acid ester includes isopropyl myristate, octyldodecyl myristate, octyl palmitate, stearyl stearate, sorbitan monooleate, sorbitan monostearate, pentaerythritol monooleate, pentaerythritol monostearate, polyoxyethylene sorbitan tristearate, 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate, pentaerythritol-tri-12-hydroxystearate, an ester compound formed between succinic acid and triethylene glycol monomethyl ether, and the like. Among them, at least one member selected from the group consisting of 12-hydroxystearic acid triglyceride, pentaerythritol monostearate, pentaerythritol-mono-12-hydroxystearate, pentaerythritol-di-12-hydroxystearate, pentaerythritol-tri-12-hydroxystearate, and an ester compound formed between succinic acid and triethylene glycol monomethyl ether is preferred, and pentaerythritol monostearate and an ester compound formed between succinic acid and triethylene glycol monomethyl ether are more preferred, from the viewpoint of improving pulverization efficiency of the cellulose and impact resistance of the biodegradable resin molded article.

It is preferable that the polyether usable in the pulverization aid is a compound represented by the following general formula (2):

$$R^3-O-[(R^4O)_p-H] \quad (2)$$

wherein $R^3$, $R^4$, and p are such that, but not particularly limited to, $R^3$ is preferably a hydrogen atom, or an alkyl group or alkenyl group having from 1 to 50 carbon atoms, and that $R^4$ is preferably an alkylene group having from 2 to 4 carbon atoms, and more preferably an ethylene group or a propylene group, from the viewpoint of improving impact resistance of the biodegradable resin molded article. In addition, p is an average number of moles added, preferably a number of from 2 to 400, more preferably a number of from 5 to 200, and even more preferably a number of from 5 to 150.

It is preferable that specific examples of the compound of the general formula (2) are a compound represented by the following general formula (3):

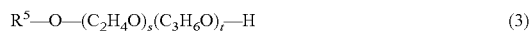

$$R^5-O-(C_2H_4O)_s(C_3H_6O)_t-H \quad (3)$$

wherein $R^5$ is a hydrogen atom, or an alkyl group having from 1 to 22 carbon atoms; each of s and t is an average number of moles added of ethylene oxide (EO) and propylene oxide (PO), which is independently a number of from 0 to 200, and preferably a number of from 2 to 100, with proviso that s and t cannot both satisfy s=0 and t=0, and in a case where both EO and PO are contained, these EO and PO may be added in a random or block form,
from the viewpoint of improving pulverization efficiency of the cellulose and impact resistance of the biodegradable resin molded article.

The alkyl group in $R^5$ includes a methyl group, an ethyl group, an isopropyl group, a propyl group, a butyl group, a t-butyl group, an isobutyl group, various pentyl groups, various hexyl groups, various octyl groups, various decyl groups, various dodecyl groups, various tetradecyl groups, various hexadecyl groups, various octadecyl groups, and the like. It is preferable that $R^5$ is a hydrogen atom or an alkyl group having from 1 to 18 carbon atoms, from the viewpoint of improving pulverization efficiency of the cellulose and impact resistance of the biodegradable resin molded article.

The polyether usable in the present invention has a weight-average molecular weight of preferably within the range of from 100 to 20,000, and more preferably within the range of from 400 to 20,000. The weight-average molecular weight is measured using polystyrene as a standard substance according to GPC method using chloroform as a solvent.

In addition, in the present invention, other pulverization aid can be used in addition to the above pulverization aid, within the range that would not impair the effects of the present invention. Other pulverization aids include amides of aromatic carboxylic acids, such as trimesic acid tris(t-butylamide), m-xylylenebis 12-hydroxystearic amide, and 1,3,5-benzenetricarboxylic acid tricyclohexylamide; rosin amides, such as p-xylylenebis rosin amide; metal salts of dialkyl esters of aromatic sulfonic acids, such as dibarium dimethyl 5-sulfoisophthalate and dicalcium dimethyl 5-sulfoisophthalate; metal salts of phosphoric esters, such as sodium-2,2'-methylenebis(4,6-di-t-butylphenyl) phosphate and aluminum bis(2,2'-methylenebis-4,6-di-t-butylphenyl phosphate); metal salts of rosin acids, such as potassium methyldehydroabietate; carbohydrazides such as decamethylene dicarbonyl dibenzoyl hydrazide; N-substituted ureas, such as xylenebis stearylurea; salts of melamine compounds, such as melamine cyanurate; and urasils, such as 6-methylurasil.

The above pulverization aids can be used alone or in a combination of two or more kinds in any proportions.

In the present invention, the pulverization aid is added in an amount of preferably from 0.1 to 100 parts by weight, more preferably from 0.5 to 50 parts by weight, even more preferably from 1 to 30 parts by weight, and even more preferably from 2 to 20 parts by weight, based on 100 parts by weight of the cellulose to be subjected to the tertiary pulverization. If the pulverization aid is added in an amount of 0.1 parts by weight or more, based on 100 parts by weight of the cellulose to be subjected to the tertiary pulverization, the average particle size of the cellulose can be reduced, and if the pulverization aid is added in an amount of 100 parts by weight or less, the cellulose having an average particle size of 30 µm or less can be efficiently obtained.

The treatment time for the tertiary pulverization can be properly adjusted depending upon the kinds of pulverizers, the kinds, sizes, and filling ratios of media filling the pulverizers, and the like. The treatment time is preferably from 0.01 to 50 hr, more preferably from 0.05 to 20 hr, even more preferably from 0.10 to 10 hr, even more preferably from 0.10 to 5 hr, and even more preferably from 0.10 to 3.5 hr, from the viewpoint of efficiently reducing an average particle size of the cellulose. The pulverization treatment temperature is, but not particularly limited to, preferably from 5° to 250° C., more preferably from 10° to 200° C., and even more preferably from 15° to 150° C., from the viewpoint of preventing thermal degradation.

Thus, according to the tertiary pulverization, fine cellulose particles in which strong aggregation of the cellulose particles themselves is inhibited are obtained. The fine cellulose particles have an average particle size of preferably from 0.1 to 30 µm, and more preferably from 0.1 to 20 µm.

The cellulose having a crystallinity of less than 50% is contained in an amount of preferably 1 part by weight or more, based on 100 parts by weight of the biodegradable resin, from the viewpoint of obtaining appropriate flexural strength and flexural modulus, and the cellulose having a crystallinity of less than 50% is contained in an amount of preferably 350 parts by weight or less, based on 100 parts by weight of the biodegradable resin, from the viewpoint of avoiding exceeding increase in flexural strength or flexural modulus. The cellulose having a crystallinity of less than 50% is contained in an amount of preferably from 1 to 300 parts by weight, more preferably from 5 to 100 parts by weight, and even more preferably from 5 to 50 parts by weight, based on 100 parts by weight of the biodegradable resin, from the viewpoint of flexibility and impact resistance of the biodegradable resin molded article. In other words, the cellulose having a crystallinity of less than 50% is contained in an amount of preferably from 1 to 300 parts by weight, more preferably from 5 to 100 parts by weight, and even more preferably from 5 to 50 parts by weight, based on 100 parts by weight of the biodegradable resin, from the viewpoint of satisfying flexural strength, flexural modulus, flexibility, and impact resistance of the biodegradable resin molded article.

The biodegradable resin composition of the present invention may, in addition to the biodegradable resin and the cellulose having a crystallinity of less than 50% mentioned above, further properly contain a plasticizer, an organic crystal nucleating agent, an inorganic filler, a flame retardant, a hydrolysis inhibitor, or the like.

[Plasticizer]

The cellulose having a crystallinity of less than 50% contained in the biodegradable resin composition of the present invention has a markedly reduced crystallinity, as compared to celluloses that are usable in the conventional biodegradable resin compositions. For this reason, although the cellulose plays a plasticizer-like role by itself, it is preferable that the biodegradable resin composition of the present invention contains a plasticizer, from the viewpoint of further improvement of strength and flexibility, and impact resistance of the biodegradable resin composition.

The plasticizer includes, but not particularly limited to, known compounds. It is desired that the plasticizer contains an ester compound having two or more ester groups in one molecule, wherein at least one of an alcohol component constituting the ester is an alkylene oxide adduct of an alcohol with an alkylene oxide having from 2 to 3 carbon atoms per one hydroxyl group in an amount of from 0.5 to 5 mol in average, from the viewpoint of satisfying both strength and flexibility of the biodegradable resin composition.

When the plasticizer contains the above ester compound, heat resistance of the biodegradable resin composition, and its compatibility with the biodegradable resin and the cellulose having a crystallinity of less than 50% are favorable. For this reason, bleeding resistance is improved, and at the same time an effect of making the biodegradable resin flexible is also improved. Therefore, because of the improvement in making this biodegradable resin flexible, it is considered that when the biodegradable resin is crystallized, the growth rate is also improved. As a result, since the biodegradable resin retains flexibility even at a low die temperature, it is considered that the crystallization of the biodegradable resin progresses with a shorter die retention time, so that excellent moldability is exhibited. In addition, as a result of improving the compatibility with the cellulose having a crystallinity of less than 50%, it is considered that the biodegradable resin composition satisfying both excellent strength and flexibility can be obtained by the interaction therewith.

The ester compound is obtained by polycondensation of an alcohol component and a carboxylic acid component.

The alcohol component can contain, but not particularly limited to, a monohydric alcohol, a polyhydric alcohol, or the like. Among them, an alkylene oxide adduct of an alcohol with an alkyleneoxy group having 2 or 3 carbon atoms in an amount of preferably from 0.5 to 5 mol, more preferably from 1 to 4 mol, and even more preferably from 2 to 3 mol, per one hydroxyl group of the alcohol, in an average number of moles, from the viewpoint of compatibility with the biodegradable resin, plasticizing efficiency, and volatility-resistance. If the average number of moles of the alkyleneoxy group having 2 or 3 carbon atoms is 0.5 mol or more, the alcohol component can provide the biodegradable resin with sufficient plasticity, and if the average number of moles of the alkyleneoxy group is 5 mol or less, an effect of bleeding resistance becomes favorable. The alkyleneoxy group having 2 or 3 carbon atoms is preferably an ethyleneoxy group, from the viewpoint of plasticizing efficiency.

In addition, it is desired that a functional group other than the alkyleneoxy group bound to the ester group is, in a case of a monohydric alcohol, a hydrocarbon group having preferably from 1 to 8 carbon atoms, more preferably from 1 to 6 carbon atoms, even more preferably from 1 to 4 carbon atoms, and even more preferably from 1 to 2 carbon atoms, from the viewpoint of compatibility. It is desired that the functional group other than the alkyleneoxy group bound to the ester group is, in a case of a polyhydric alcohol, a hydrocarbon group having preferably from 1 to 8 carbon atoms, more preferably from 1 to 6 carbon atoms, and even more preferably from 1 to 4 carbon atoms, from the viewpoint of compatibility.

Each of the alcohols constituting the above ester groups is independent. It is preferable that at least one of an alcohol contained in the alcohol component is the above alkylene oxide adduct, it is more preferable that all the alcohols are the above alkylene oxide adducts, and it is even more preferable that all the alcohols are the above alkylene oxide adduct of the same kind.

In addition, the alcohol component may contain an aromatic alcohol, from the viewpoint of volatility-resistance. Since an aromatic alcohol has more excellent compatibility with the biodegradable resin, as compared to an aliphatic alcohol having the same number of carbon atoms, the aromatic alcohol can increase the molecular weight, while maintaining bleeding resistance. The aromatic alcohol includes benzyl alcohol, and the like. Of the two or more ester groups contained in the ester compound, it is desired that preferably exceeding 0 and 1.5 or less ester groups, more preferably exceeding 0 and 1.2 or less ester groups, and even more preferably exceeding 0 and 1 or less ester groups is constituted by the aromatic alcohol.

The carboxylic acid compound contained in the carboxylic acid component includes, but not particularly limited to, known carboxylic acids, anhydrides thereof, and alkyl(1 to 3 carbon atoms) esters of the acids, and the like. Here, the carboxylic acids, anhydrides thereof, and alkyl esters of the acids are collectively referred herein as a carboxylic acid compound.

The polycondensation of the alcohol component and the carboxylic acid component can be carried out in accordance with a known method.

For example, in a case where the plasticizer usable in the present invention is a polycarboxylic acid ether ester, an intended product is obtained by directly reacting a saturated dibasic acid having from 3 to 5 carbon atoms or an anhydride thereof and a polyalkylene glycol monoalkyl ether, or carrying out transesterification between a lower alkyl ester of a saturated dibasic acid having from 3 to 5 carbon atoms and a polyalkylene glycol monoalkyl ether, each in the presence of an acid catalyst such as paratoluenesulfonic acid monohydrate or sulfuric acid, or a metal catalyst such as dibutyltin oxide. Specifically, an intended product can be obtained by, for example, feeding a reaction vessel with a polyethylene glycol monoalkyl ether, a saturated dibasic acid, and paratoluenesulfonic acid monohydrate as a catalyst so as to have a ratio of polyethylene glycol monoalkyl ether/saturated dibasic acid/paratoluenesulfonic acid monohydrate (molar ratio) of 2-4/1/0.001-0.05, and subjecting the mixture to dehydration under a normal pressure or reduced pressure at a temperature of from 100° to 130° C. in the presence or absence of a solvent such as toluene. A method of carrying out the reaction under a reduced pressure without a solvent is preferred.

In addition, in a case where the plasticizer usable in the present invention is an ester from a polyhydric alcohol, for example, an alkylene oxide having from 2 to 3 carbon atoms is added to glycerol in an amount of from 3 to 9 mol per one mol of glycerol using an autoclave at a temperature of from 120° to 160° C. in the presence of an alkali metal catalyst. To one mol of the glycerol alkylene oxide adduct thus obtained is added dropwise 3 mol of acetic anhydride at 110° C., and the mixture is aged at 110° C. for 2 hours after the termination of dropwise addition, to acetylate the compound. An intended product can be obtained by subjecting the reaction product to steam distillation under a reduced pressure, to distill off acetic acid and unreacted acetic anhydride contained.

In addition, when the plasticizer usable in the present invention is an ester from a hydroxycarboxylic acid ether, an alkylene oxide having from 2 to 3 carbon atoms is added to a hydroxycarboxylic acid such as lactic acid in an amount of from 2 to 5 mol per one mol of the hydroxycarboxylic acid, using an autoclave at a temperature of from 120° to 160° C. in the presence of an alkali metal catalyst. To one mol of a lactic acid alkylene oxide adduct thus obtained is added dropwise 1 mol of acetic anhydride at 110° C., and the mixture is aged at 110° C. for 2 hours after the termination of dropwise addition, to acetylate the compound. The reaction product is subjected to steam distillation under a reduced pressure, to distill off acetic acid and unreacted acetic anhydride contained. Next, an intended product can be obtained by charging the ingredients into a reaction vessel so as to have a ratio of the resulting product/polyalkylene glycol monoalkyl ether/paratoluenesulfonic acid monohydrate (catalyst) (molar ratio) of 1/1-2/0.001-0.05, and subjecting the mixture to dehydration at a temperature of from 100° to 130° C. under normal pressure or a reduced pressure, in the presence or absence of a solvent such as toluene.

Thus, the ester compound usable as a plasticizer is obtained. In the present invention, at least one member selected from the group consisting of an ester compound formed between succinic acid or adipic acid and polyethylene glycol monomethyl ether, and an ester compound formed between acetic acid and an ethylene oxide adduct of glycerol or ethylene glycol is preferred, and the ester compound formed between succinic acid or adipic acid and polyethylene glycol monomethyl ether is more preferred, from the viewpoint of satisfying both strength and flexibility of the biodegradable resin composition, and having moldability, plasticity, and bleeding resistance.

In addition, esters from alkyl ethers of a polyhydric alcohol, such as an ester compound formed between acetic acid and an adduct of glycerol with ethylene oxide (1 to 3 mol per one hydroxyl group) in an amount of from 3 to 9 mol in average, an ester compound formed between acetic acid and an adduct of diglycerol with propylene oxide (1 to 3 mol per one hydroxyl group) in an amount of from 4 to 12 mol in average, and an ester compound formed between acetic acid and an adduct of polyethylene glycol with ethylene oxide (1 to 3 mol per one hydroxyl group) in an amount of from 4 to 9 mol in average; and ester compounds formed between polycarboxylic acids and polyethylene glycol monomethyl ether, such as an ester compound formed between succinic acid and an adduct of polyethylene glycol monomethyl ether with ethylene oxide in an amount of from 2 to 4 mol in average, an ester compound formed between adipic acid and an adduct of polyethylene glycol monomethyl ether with ethylene oxide in an amount of from 2 to 3 mol in average, and an ester compound formed between 1,3,6-hexanetricarboxylic acid and an adduct of polyethylene glycol monomethyl ether with ethylene oxide in an amount of from 2 to 3 mol in average are more preferred, from the viewpoint of satisfying both strength and flexibility, and having excellent moldability and impact resistance of the biodegradable resin composition.

An ester compound formed between acetic acid and an adduct of glycerol with ethylene oxide (1 to 2 mol per one hydroxyl group) in an amount of from 3 to 6 mol in average, an ester compound formed between acetic acid and an adduct of polyethylene glycol with ethylene oxide in an amount of from 4 to 6 mol in average, an ester compound formed between succinic acid and an adduct of polyethylene glycol monomethyl ether with ethylene oxide in an amount of from 2 to 3 mol in average, an ester compound formed between adipic acid and diethylene glycol monomethyl ether, and an ester compound formed between 1,3,6-hexanetricarboxylic acid and diethylene glycol monomethyl ether are even more preferred, from the viewpoint of satisfying both strength and flexibility, and having excellent moldability and impact resistance of the biodegradable resin composition, and having excellent bleeding resistance of the plasticizer. An ester compound formed between succinic acid and triethylene glycol monomethyl ether is even more preferable, from the viewpoint of satisfying both strength and flexibility, and having excellent moldability and impact resistance of the biodegradable resin composition, and having excellent bleeding resistance, volatility-resistance, and resistance to irritable odors of the plasticizer.

In addition, an ester compound formed between adipic acid and a diethylene glycol monomethyl ether/benzyl alcohol mixture (weight ratio: 1/1) is preferred, from the viewpoint of volatility-resistance.

Here, it is preferable that the above ester compound is a saturated ester where all the groups relating to esterification are reacted, from the viewpoint of sufficiently exhibiting its function as a plasticizer.

The ester compound has an average molecular weight of preferably from 250 to 700, more preferably from 300 to 600, even more preferably from 350 to 550, and even more preferably from 400 to 500, from the viewpoint of satisfying both strength and flexibility, and having bleeding resistance and volatility-resistance of the biodegradable resin composition. Here, the average molecular weight can be obtained by obtaining a saponification value in accordance with a method prescribed in JIS K0070, and calculating the average molecular weight according to the following formula:

$$\text{Average Molecular Weight} = 56{,}108 \times \frac{\text{Number of Ester Groups}}{\text{Saponification Value}}$$

The plasticizer may properly contain, besides the above ester compound, other plasticizers within the range that would not impair the effects of the present invention. The above ester compound is contained, but not particularly limited to, in an amount of preferably 60% by weight or more, more preferably 70% by weight or more, even more preferably 90% by weight or more, and even more preferably substantially 100% by weight, of the plasticizer, from the viewpoint of satisfying both strength and flexibility of the biodegradable resin composition, and having bleeding resistance.

The plasticizer is contained in an amount of preferably from 5 to 50 parts by weight, more preferably from 7 to 30 parts by weight, even more preferably from 8 to 30 parts by weight, and even more preferably from 8 to 20 parts by weight, based on 100 parts by weight of the biodegradable resin, from the viewpoint of satisfying both strength and flexibility, and obtaining impact resistance of the biodegradable resin composition.

[Organic Crystal Nucleating Agent]

The organic crystal nucleating agent includes amides, such as fatty acid monoamides, fatty acid bisamides, aromatic carboxylic acid amides, and rosin amides; hydroxyfatty acid esters; metal salts such as metal salts of dialkyl esters of aromatic sulfonic acids, metal salts of phenylphosphonic acids, metal salts of phosphoric esters, and metal salts of rosin acids; carbohydrazides; N-substituted ureas; organic pigments, and the like. At least one compound selected from the group consisting of a compound having a hydroxyl group and an amide group in one molecule, and hydroxyfatty acid esters is preferred, and a combined use of at least one of these compounds listed above with a metal salt of a phenylphosphonic acid is more preferred, and a combined use of the compound having a hydroxyl group and an amide group in one molecule and a metal salt of a phenylphosphonic acid is even more preferred, from the viewpoint of satisfying both strength and flexibility, and having moldability, heat resistance, and impact resistance of the biodegradable resin composition, and anti-blooming property of the organic crystal nucleating agent.

Specific examples of the compound having a hydroxyl group and an amide group in one molecule include hydroxyfatty acid monoamides such as 12-hydroxystearic acid monoethanolamide; hydroxyfatty acid bisamides, such as methylenebis 12-hydroxystearic amide, ethylenebis 12-hydroxystearic amide, and hexamethylenebis 12-hydroxystearic amide; and the like. Among them, the fatty acid bisamides having two or more hydroxyl groups and two or more amide groups are preferred, from the viewpoint of improving compatibility with the biodegradable resin and accomplishing satisfaction of both strength and flexibility of the biodegradable resin composition. Alkylenebis hydroxystearic amides, such as methylenebis 12-hydroxystearic amide, ethylenebis 12-hydroxystearic amide, and hexamethylenebis 12-hydroxystearic amide are more preferred, and ethylenebis 12-hydroxystearic amide is even more preferred, from the viewpoint of moldability, heat resistance, and impact resistance of the biodegradable resin composition, and anti-blooming property.

The compound having a hydroxyl group and an amide group in one molecule has a melting point of preferably 65° C. or more, more preferably from 70° to 220° C., and even more preferably from 80° to 190° C., from the viewpoint of improving dispersibility of the organic crystal nucleating agent upon kneading and improving a crystallization velocity of the biodegradable resin composition.

Specific examples of the hydroxyfatty acid ester include hydroxyfatty acid esters, such as 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate, and pentaerythritol-tri-12-hydroxystearate. 12-Hydroxystearic acid triglyceride is preferred, from the viewpoint of satisfying both strength and flexibility, and having moldability, heat resistance, and impact resistance of the biodegradable resin composition, and anti-blooming property of the organic crystal nucleating agent.

As the metal salt of a phenylphosphonic acid, the same ones as those listed as the examples of the above pulverization aids are exemplified.

In the present invention, as the organic crystal nucleating agent, in a case where at least one compound selected from the group consisting of the compound having a hydroxyl group and an amide group in one molecule and hydroxyfatty acid esters is used together with a metal salt of a phenylphosphonic acid, the proportion of these compounds is such that at least one compound selected from the group consisting of the compound having a hydroxyl group and an amide group in one molecule and hydroxyfatty acid esters/the metal salt of a phenylphosphonic acid (weight ratio) is preferably from 20/80 to 80/20, more preferably from 30/70 to 70/30, and even more preferably from 40/60 to 60/40, from the viewpoint of exhibiting the effects of the present invention.

The organic crystal nucleating agent is contained in an amount of preferably from 0.05 to 5 parts by weight, more preferably from 0.10 to 3 parts by weight, even more preferably from 0.20 to 2 parts by weight, and even more preferably from 0.20 to 1 part by weight, based on 100 parts by weight of the biodegradable resin, from the viewpoint of satisfying both strength and flexibility, and obtaining impact resistance of the biodegradable resin composition.

The inorganic filler includes silicates, such as talc, kaolin, mica, and montmorillonite; inorganic compounds, such as silica, magnesium oxide, and aluminum hydroxide; fibrous inorganic fillers such as glass fiber, carbon fiber, graphite fiber, and wollastonite; and the like. The inorganic filler has an average particle size of preferably from 0.1 to 20 µm, and more preferably from 0.1 to 10 µm, from the viewpoint of obtaining favorable dispersibility. Among the inorganic fillers, the silicates are preferred, talc or mica is more preferred, and talc is even more preferred, from the viewpoint of moldability and heat resistance of the biodegradable resin molded article. In addition, silica is preferred, from the viewpoint of satisfying both strength and flexibility, and having moldability and transparency of the biodegradable resin composition.

The average particle size of the inorganic filler can be obtained by measuring a volume-median particle size according to a diffraction and scattering method. For example, a commercially available apparatus includes a laser diffraction and light scattering particle size analyzer LS230 commercially available from Coulter, and the like.

The inorganic filler is contained in an amount of preferably from 1 to 200 parts by weight, more preferably from 3 to 50 parts by weight, and even more preferably from 5 to 40 parts by weight, based on 100 parts by weight of the biodegradable resin, from the viewpoint of satisfying both strength and flexibility, and obtaining sufficient heat resistance and impact resistance of the biodegradable resin composition.

As the flame retardant, any known ones, such as phosphorus-containing flame retardants, and non-halogen-containing flame retardants such as aluminum hydroxide and magnesium hydroxide can be used. The flame retardant is contained in an amount that is determined while observing the effect of the flame retardant. The flame retardant is contained in an amount of preferably from 10 to 60 parts by weight, and more preferably from 15 to 55 parts by weight, based on 100 parts by weight of the biodegradable resin, from the viewpoint of obtaining a favorable flame retardant effect, and inhibiting fluidity upon processing, and the strength or impact resistance of the molded article from being lowered.

The hydrolysis inhibitor includes carbodiimide compounds, such as polycarbodiimide compounds and monocarbodiimide compounds. The polycarbodiimide compounds are preferred, from the viewpoint of satisfying both strength and flexibility, and having moldability of the biodegradable resin composition, and the monocarbodiimide compounds are preferred, from the viewpoint of heat resistance and impact resistance of the biodegradable resin composition, and anti-blooming property of the organic crystal nucleating agent.

The polycarbodiimide compound includes poly(4,4'-diphenylmethanecarbodiimide), poly(4,4'-dicyclohexylmethanecarbodiimide), poly(1,3,5-triisopropylbenzene) polycarbodiimide, poly(1,3,5-triisopropylbenzene and 1,5-diisopropylbenzene)polycarbodiimide, and the like. The monocarbodiimide compound includes N,N'-di-2,6-diisopropylphenylcarbodiimide, and the like.

In order to satisfy moldability, heat resistance, and impact resistance of the biodegradable resin composition and anti-blooming property of the organic crystal nucleating agent, the above carbodiimide compounds may be used alone or in a combination of two or more kinds. In addition, as the poly(4,4'-dicyclohexylmethanecarbodiimide), Carbodilite LA-1 (commercially available from Nisshin Boseki) can be purchased and used; as the poly(1,3,5-triisopropylbenzene)polycarbodiimide and poly(1,3,5-triisopropylbenzene and 1,5-diisopropylbenzene)polycarbodiimide, Stabaxol P and Stabaxol P-100 (commercially available from Rhein Chemie) can be purchased and used; and as N,N'-di-2,6-diisopropylphenylcarbodiimide, Stabaxol 1 and Stabaxol 1-LF (commercially available from Rhein Chemie) can be purchased and used, respectively.

The hydrolysis inhibitor is contained in an amount of preferably from 0.05 to 3 parts by weight, more preferably from 0.10 to 2 parts by weight, and even more preferably from 0.20 to 1 part by weight, based on 100 parts by weight of the biodegradable resin, from the viewpoint of moldability of the biodegradable resin composition.

In addition, the biodegradable resin composition of the present invention can further contain, besides the above, other components such as an antioxidant, such as a hindered phenol or a phosphite, or a lubricant, such as a hydrocarbon-based wax or an anionic surfactant. Each of the antioxidant and the lubricant is contained in an amount of preferably from 0.05 to 3 parts by weight, and more preferably from 0.10 to 2 parts by weight, based on 100 parts by weight of the biodegradable resin.

Furthermore, the biodegradable resin composition of the present invention can contain, besides the above, other component, such as an antistatic agent, an anti-clouding agent, a photostabilizer, an ultraviolet absorbent, a pigment, a mildewproof agent, a bactericidal agent, or a blowing agent, within the range that would not impair the effects of the present invention.

The biodegradable resin composition of the present invention can be prepared without particular limitation, so long as the composition contains a biodegradable resin and a cellulose having a crystallinity of less than 50%. Upon mixing the cellulose having a crystallinity of less than 50% with the biodegradable resin, for example, a method of preparing a compound mixture including the step of kneading a cellulose having a crystallinity of less than 50%, the cellulose previously having a given particle size, into a biodegradable resin with a twin-screw extruder or a melting mixer may be employed. In this method, upon feeding the cellulose having a crystallinity of less than 50% to an extruder, a biodegradable resin alone is firstly melted, and thereafter a cellulose having a crystallinity of less than 50% may be fed from a half-way of a twin-screw extruder with a side feeder or the like.

The biodegradable resin composition of the present invention has favorable processability, the composition can be processed at a low temperature of, for example, 200° C. or less, so that even when a plasticizer is used, there is an advantage that degradation of the plasticizer is less likely to take place, whereby the composition can be molded into a film or a sheet to be used in various applications.

<Biodegradable Resin Molded Article and Method for Producing Molded Article>

The biodegradable resin molded article of the present invention is obtained by molding the biodegradable resin composition of the present invention. Specifically, for example, while melting a polylactic acid resin and a cellulose having a crystallinity of less than 50% with an extruder or the like, a plasticizer, an organic crystal nucleating agent, an inorganic filler or the like is mixed therewith, as occasion demands, and a molten mixture obtained is filled in a die with an injection molding machine or the like to mold. In order to accelerate the plasticity of the biodegradable resin upon melting, the mixing may be carried out while melting in the presence of a supercritical gas.

The biodegradable resin molded article of the present invention can satisfy both strength and flexibility, while containing a cellulose having a crystallinity of less than 50%.

A preferred method for producing a biodegradable resin molded article of the present invention is a method including the steps of melt-kneading a biodegradable resin composition containing a biodegradable resin and a cellulose having a crystallinity of less than 50% [hereinafter referred to as step (1)]; and filling a molten mixture obtained in step (1) in a die at a temperature of 110° C. or less to mold [hereinafter referred to as step (2)].

Specific examples of step (1) include, for example, the step of melt-kneading a biodegradable resin and a cellulose having a crystallinity of less than 50% at a temperature of from 160° to 250° C. with a melt-kneading machine, and the like. The melt-kneading machine is not particularly limited, and exemplified by a twin-screw extruder, and the like. Also, the melt-kneading temperature is preferably from 160° to 250° C., more preferably from 165° to 230° C., and even more preferably from 170° to 210° C., from the viewpoint of moldability and inhibition of degradation of the biodegradable resin composition.

In the present invention, a method including the steps of cooling a molten mixture after step (1) to an amorphous state (in other words, conditions at which a crystallinity measured by wide-angle X-ray diffraction method is 1% or less), and thereafter carrying out step (2), or a method including the steps of cooling a molten mixture after step (1), and thereafter immediately carrying out step (2) is preferred. The method including the steps of cooling a molten mixture after step (1), and thereafter immediately carrying out step (2) is more preferred, from the viewpoint of exhibiting the effects of improving the crystallization velocity.

Specific examples of step (2) include, for example, the step of filling a biodegradable resin composition in a die at a temperature of 110° C. or less to mold with an injection molding machine or the like, and the like. The die temperature in step (2) is preferably 110° C. or less, more preferably 90° C. or less, and even more preferably 80° C. or less, from the viewpoint of improving the crystallization velocity and operability. Also, the die temperature is preferably 30° C. or more, more preferably 40° C. or more, and even more preferably 60° C. or more. From these viewpoints, the die temperature is preferably from 30° to 110° C., more preferably from 40° to 90° C., and even more preferably from 60° to 80° C.

The retention time within the die in step (2) is preferably from 5 to 60 seconds, more preferably from 8 to 50 seconds, and even more preferably from 10 to 45 seconds, from the viewpoint of accomplishing a relative crystallinity of 60% or more and improving productivity. Here, the term relative crystallinity as used herein refers to a crystallinity that is expressed by the following formula:

$$\text{Relative Crystallinity (\%)} = \{(\Delta Hm - \Delta Hcc)/\Delta Hm \times 100\}$$

Specifically, the relative crystallinity can be obtained with a DSC apparatus (Diamond DSC, commercially available from Perkin-Elmer), using $\Delta Hcc$, which is an absolute value of a cold crystallization enthalpy of a polylactic acid resin observed in 1st RUN and $\Delta Hm$, melt crystallization enthalpy observed in 2nd RUN, wherein 1st RUN includes the steps of heating from 20° to 200° C. at a heating rate of 20° C./minute, holding at 200° C. for 5 minutes, cooling from 200° to 20° C. at a cooling rate of −20° C./minute, holding at 20° C. for 1 minute, and 2nd RUN includes, after 1st RUN, the step of heating from 20° to 200° C. at a heating rate of 20° C./minute.

EXAMPLES

The following examples further describe and demonstrate embodiments of the present invention. The examples are given solely for the purposes of illustration and are not to be construed as limitations of the present invention.

[Melting Points of Polylactic Acid Resins]

The melting points of the polylactic acid resins are obtained with a DSC apparatus (Diamond DSC, commercially available from Perkin-Elmer) from an endothermic peak temperature of melt crystallization according to a heating method for measuring differential scanning calorimetry as prescribed in JIS-K7121. The measurement of a melting point is taken while heating a sample from 20° to 250° C. at a heating rate of 10° C./minute.

[Glass Transition Temperatures of Polylactic Acid Resins]

The glass transition temperature of the polylactic acid resin is a value obtained from a peak temperature of loss modulus (E") in dynamic viscoelasticity measurement using a DMS apparatus (DMS 6100, commercially available from Seiko Instruments Inc.). The dynamic viscoelasticity measurement is taken by heating a sample from −100° to 150° C. at a heating rate of 2° C./minute.

[Average Particle Size of Cellulose-Containing Raw Material of which Amount of Water Contained is Adjusted]

Sieves having sieve openings of X μm and 0.9×μm are furnished, and a 50 g sample is placed on the sieves and classified by sieving. At this time, a case where a weight of a cellulose passing through a sieve having a sieve opening of X μm but remaining on without passing through a sieve having a sieve opening of 0.9×μm is 90% by weight (45 g) or more is defined as an average particle size X μm of the cellulose-containing raw material.

[Average Particle Sizes of Cellulose-Containing Raw Material Obtained by Primary Pulverization, Amorphous Cellulose, and Crystalline Cellulose]

The average particle sizes of the cellulose-containing raw material obtained by primary pulverization, the amorphous cellulose, and the crystalline cellulose mean a volume-median particle size ($D_{50}$), which is measured with a laser diffraction/scattering type particle size distribution analyzer "LA-920" (commercially available from Horiba LTD.). Measurement conditions are a treatment with ultrasonic wave for 1 minute before the measurement of particle sizes, water being used as a dispersion medium upon the measurement, and the volume-average particle size ($D_{50}$) is measured at a temperature of 25° C.

[Bulk Density of Cellulose-Containing Raw Material]

The bulk density is measured with "Powder Tester" commercially available from Hosokawa Micron Corporation. The bulk density is calculated by vibrating sieves to allow a sample to drop through a chute and receive in a defined vessel (volume: 100 mL), and measuring the weight of the sample in the vessel. Here, as to a flocculated sample, the bulk density is calculated by allowing the sample to drop through the chute without passing through the sieves and receive in a defined vessel (volume: 100 mL), and measuring the weight of the sample in the vessel.

[Cellulose I Crystallinity]

The cellulose I crystallinity is obtained by measuring X-ray diffraction intensity of a sample with "Rigaku RINT 2500VC X-RAY diffractometer" commercially available from Rigaku under the following conditions, and calculating a crystallinity based on the above calculation formula. Here, a sample for the measurement is prepared by compressing pellets to a size having an area of 320 mm² and a thickness of 1 mm.

X-ray Source: Cu/Kα-radiation
Tube Voltage: 40 kV
Tube Current: 120 mA
Measurement Range Diffraction angle 2θ=5 to 45°
Scanning Speed: 10°/min

[Water Content of Cellulose-Containing Raw Material]

The water content is measured with an infrared moisture determination balance ("FD-610" commercially available from Kett Electric Laboratory) at 150° C.

[Cellulose Content]

The cellulose content is measured in accordance with a holocellulose quantification method described on pages 1081-1082 of *Bunseki Kagakubinran* (*Analytical Chemistry Handbook*) (*Kaitei 4-han* (*Revised Fourth Edition*), Nov. 30, 1991, published by Maruzen Company, Limited), edited by The Japan Society of Analytical Chemistry.

[Amount of Lignin Contained in Cellulose]

In accordance with Klason-Lignin method, an amount of an acid-insoluble lignin and an amount of an acid-soluble lignin are obtained, and a total amount thereof is defined as an amount of lignin contained in the cellulose.

Specifically, a 0.3 g sample prepared by extracting an organic solvent-soluble fraction from an about 7.5 g sample pulverized to a particle size of 1.0 mm with a mixed solvent of ethanol and benzene [ethanol/benzene=1/2 (weight ratio)] in accordance with Soxley extraction is combined with 72% $H_2SO_4$ (4.5 mL) on ice, and the mixture is incubated (1125 r/m) at 30° C. Next, the concentration of $H_2SO_4$ is diluted with distilled water to about 3%, and heated in an autoclave for 30 minutes, and the heated mixture is subjected to suction filtration. The residue is weighed and defined as an amount of an acid-insoluble lignin. In addition, a 3% $H_2SO_4$ (2.7 mL) is added to 0.3 mL of the filtrate to dilute the filtrate 10-folds, and a maximum absorbance in the vicinity of from 205 to 210 nm is measured with a spectrophotometer (commercially available from HITACHI, LTD., U-2010), and an amount of an acid-soluble lignin is obtained from the absorbance by the following formula:

Amount of Acid-Soluble Lignin (%)=100×Dilution Rate×Amount of Filtrate (L)×(Absorbance of Sample Solution−Absorbance of 3% $H_2SO_4$) ÷{Coefficient of Absorbance for Lignin (=110 L/g·cm)×Weight (g) of Sample Use×Cell Length for Absorbance Measurement (cm)}.

[Average Molecular Weight of Plasticizer]

The average molecular weight is obtained by obtaining a saponification value according to a method as prescribed in JIS K0070, and calculating an average molecular weight according to the following formula:

$$\text{Average Molecular Weight} = 56{,}108 \times \frac{\text{Number of Ester Groups}}{\text{Saponification Value}}$$

[Melting Points of Organic Crystal Nucleating Agent]

The melting point is measured with a DSC apparatus (Diamond DSC commercially available from Perkin-Elmer) by heating a sample from 20° to 500° C. at a heating rate of 10° C./minute.

Next, Production Examples of a cellulose having a crystallinity of less than 50% are given. Here, in the present Examples, a cellulose having a crystallinity of less than 50% is referred to as "amorphous cellulose," and a cellulose having a crystallinity of 50% or more is referred to as "crystalline cellulose." The average particle size and the crystallinity of each of amorphous celluloses obtained in the following Production Examples, and a crystalline cellulose are shown in Tables 1 to 5.

Production Example 1 of Amorphous Cellulose

[Treatment with Shredder (Rough Pulverization)]

A cellulose-containing raw material sheet-like wooden pulp ("Blue Bear Ultra Ether" commercially available from Borregard, 800 mm×600 mm×1.5 mm, crystallinity: 81%, cellulose content (content in the residual component obtained by removing water from the cellulose-containing raw material, hereinafter referred to the same): 96% by weight, water content: 7.0% by weight) was loaded to a shredder ("MSX2000-IVP440F," commercially available from Meikoshokai Co., Ltd.), to produce pulp in the form of chips of about 10 mm×about 5 mm×about 1.5 mm.

[Treatment with Extruder (Primary Pulverization)]

The pulp obtained in the form of chips was supplied into a twin-screw extruder ("EA-20," commercially available from Suchiro EPM Corporation) at a rate of 2 kg/hr, and subjected to one-pass treatment at a shearing rate of 660 sec$^{-1}$ and a screw rotational speed of 300 r/min, while allowing a cold water to flow from an external. Here, the above twin-screw extruder is a completely engaging, co-rotating twin-screw extruder, in which the screws arranged in two rows comprise a screw member having a screw diameter of 40 mm and a kneading disc member used in combination of 12 blocks arranged alternately with the screw member (90°), and the two screws have the same constitution. In addition, the temperature of the twin-screw extruder was from 30° to 70° C. due to heat generation accompanying the treatment. The pulp obtained after the treatment with the extruder (after primary pulverization) had an average particle size of 120 μm and a bulk density of 219 kg/m$^3$.

[Treatment with Pulverizer (Secondary Pulverization)]

The pulp obtained after the treatment with the extruder was supplied in an amount of 50 g to a pulverizer A, which is a batch-process agitating pulverizer ("Sand Grinder" commercially available from Igarashi Kikai, vessel volume: 800 mL, filled with 720 g of zirconia beads having a diameter of 5 mm, filling ratio: 25%, diameter of agitation blades: 70 mm). While allowing a cold water to flow through a vessel jacket, the pulp was subjected to a pulverization treatment for 180 minutes at a rotational speed of agitation of 2000 r/min. The temperature during the operation was within the range of from 30° to 70° C.

After the termination of the treatment, no solid deposits of pulp or the like were found on the wall side and the bottom of the agitating pulverizer. The pulp obtained after the secondary pulverization treatment was taken out of the above agitating pulverizer, and sieved with a sieve having a sieve opening of 75 μm. As a result, as a screen-passed product, 45 g (90% by weight of the amount supplied) of an amorphous cellulose A was obtained.

Production Example 2 of Amorphous Cellulose

The same procedures as in Production Example 1 were carried out, except that the pulverization treatment time was changed from 180 minutes to 45 minutes in the treatment with the pulverizer (secondary pulverization), to provide an amorphous cellulose B.

Production Example 3 of Amorphous Cellulose

The same procedures as in Production Example 1 were carried out, except that the pulverization treatment time was changed from 180 minutes to 90 minutes in the treatment with the pulverizer (secondary pulverization), to provide an amorphous cellulose C.

Production Example 4 of Amorphous Cellulose

Fifty grams of the pulp obtained after the treatment with the extruder (after the primary pulverization) was supplied into a pulverizer used in the secondary pulverization vibration mill ("MB-1" commercially available from CHUO KAKOHKI CO., LTD., entire vessel volume: 3.5 L), and the vibration mill was filled with 11 rods (cross-sectional shape: a circle, diameter: 30 mm, length: 218 mm, material:stainless steel) (filling ratio: 48%). The pulp was subjected to a treatment for 60 minutes under the conditions of an oscillation of 8 mm and a rotational speed of 1200 rotations/minute. The temperature during the operation was 30° C.

After the termination of the treatment, no solid deposits of pulp or the like were found on the wall side and the bottom of the vibration mill. The pulp obtained after the secondary pulverization treatment was taken out of the above vibration mill, and sieved with a sieve having a sieve opening of 75 μm. As a result, as a screen-passed product, 30 g (60% by weight of the amount supplied) of an amorphous cellulose D was obtained.

Production Example 5 of Amorphous Cellulose

[Treatment with Extruder (Primary Pulverization)]

The primary pulverization was carried out in the same manner as in Production Example 1, except that pine chips ("Kaiteki Funwari Beddo (Comfortable Soft Bed)," commercially available from DoggyMan H. A. Co., Ltd., cellulose content: 66% by weight, water content: 7.2% by weight) were used as a cellulose-containing raw material. The cellulose-containing raw material obtained after the treatment with the extruder (after primary pulverization) had an average particle size of 105 μm and a bulk density of 225 kg/m$^3$.

[Treatment with Pulverizer (Secondary Pulverization)]

Fifty grams of the cellulose-containing raw material obtained after the treatment with the extruder (after primary pulverization) was treated for 75 minutes under the same conditions as in Production Example 4, using the same pulverizer as in Production Example 4 as a pulverizer used in the secondary pulverization. The temperature during the operation was 30° C.

After the termination of the treatment, no solid deposits of chips or the like were found on the wall side and the bottom of the pulverizer. The chips obtained after the secondary pulverization treatment were taken out of the pulverizer, and sieved with a sieve having a sieve opening of 75 μm. As a result, as a screen-passed product, 43 g (85% by weight of the amount supplied) of an amorphous cellulose E was obtained.

Production Example 6 of Amorphous Cellulose

Seven-hundred and forty grams of pine chips ("Kaiteki Funwari Beddo (Comfortable Soft Bed)," commercially available from DoggyMan H. A. Co., Ltd., cellulose content: 66% by weight, lignin content: 33% by weight, water content: 7.2% by weight) were used as a cellulose-containing raw material and subjected to a reaction for 240 minutes under the conditions of 172° C. and 0.9 MPa with a heating and pressing machine (commercially available from Kochi Prefectural Paper Industry Technology Center in the presence of 132 g of sodium hydroxide, 0.33 g of anthraquinone, and 3300 g of water, to perform a delignification reaction according to an alkali cooking treatment. The cooked product obtained was washed under running water until the washing reached a pH of 7, and dried at 105° C., and the same procedures as in Production Example 5 were carried out using a product obtained as a raw material for the treatment with the extruder (primary pulverization) (cellulose content: 93% by weight, lignin content: 6.0% by weight, and water content: 5.2% by weight), to provide an amorphous cellulose F.

Production Example 7 of Amorphous Cellulose

The same procedures as in Production Example 5 were carried out, except that the cellulose-containing raw material was changed to Japanese cedar chips ("Sugi Kinoko Chips (Japanese cedar fungus chips)," commercially available from Saninmaruwa Forestry Co., Ltd., cellulose content: 72% by weight, water content: 7.5% by weight), to provide an amorphous cellulose G.

Production Example 8 of Amorphous Cellulose

The same procedures as in Production Example 5 were carried out, except that the cellulose-containing raw material was changed to Japanese cypress chips ("Hinoki Kinoko Chips (Japanese cypress fungus chips)," commercially available from Saninmaruwa Forestry Co., Ltd., cellulose content: 71% by weight, water content: 7.4% by weight), to provide an amorphous cellulose H.

Production Example 9 of Amorphous Cellulose

The rough pulverization treatment was carried out in the same manner as in Production Example 1, except that the cellulose-containing raw material was changed to newspaper (commercially available from THE YOMIURI SHIMBUN, cellulose content: 83% by weight, water content: 7.7% by weight), and thereafter the treatments on and after the primary pulverization treatment were carried out in the same manner as Production Example 5, to provide an amorphous cellulose I.

Production Example 10 of Amorphous Cellulose

The same procedures as in Production Example 9 were carried out, except that the cellulose-containing raw material was changed to magazine ("MORE," commercially available from SHUEISHA, Inc., cellulose content: 60% by weight, water content: 7.7% by weight), to provide an amorphous cellulose J.

Production Example 11 of Amorphous Cellulose

The same procedures as in Production Example 9 were carried out, except that the cellulose-containing raw material was changed to corrugated cardboard (commercially available from OKAJI KAMIGYO, cellulose content: 84% by weight, water content: 7.7% by weight), to provide an amorphous cellulose K.

Production Example 12 of Amorphous Cellulose

The same procedures as in Production Example 9 were carried out, except that the cellulose-containing raw material was changed to deinked pulp (commercially available from KOKKO Corporation, cellulose content: 92% by weight, water content: 7.7% by weight), to provide an amorphous cellulose L.

Production Example 13 of Amorphous Cellulose

The same procedures as in Production Example 5 were carried out, except that the cellulose-containing raw material was changed to rice plant straw (cellulose content: 55% by weight, water content: 8.0% by weight), to provide an amorphous cellulose M.

Production Example 14 of Amorphous Cellulose

The same procedures as in Production Example 5 were carried out, except that the cellulose-containing raw material was changed to rice hulls (cellulose content: 60% by weight, water content: 13.6% by weight), to provide an amorphous cellulose N.

Production Example 15 of Amorphous Cellulose

[Treatment with Pulverizer (Tertiary Pulverization)]

Fifty grams of the amorphous cellulose A and 5 g of a pulverization aid stearyl alcohol (KALCOL 8098, commercially available from Kao Corporation) were mixed together, and the entire amount of the mixture was supplied into a pulverizer B a vibration mill ("MB-1," commercially available from CHUO KAKOHKI CO., LTD., entire vessel volume: 3.5 L), and the vibration mill was filled with 11 rods (cross-sectional shape: a circle, diameter: 30 mm, length: 218 mm, material:stainless steel) (filling ratio: 48%). The mixture was subjected to a pulverization treatment for 15 minutes under the conditions of an oscillation of 8 mm and a rotational speed of 1200 rotations/minute, to provide an amorphous cellulose O.

Production Example 16 of Amorphous Cellulose

The same procedures as in Production Example 15 were carried out, except that the kind of the pulverization aid was changed to sodium stearate (LUNAC S-98, commercially available from Kao Corporation), to provide an amorphous cellulose P.

Production Example 17 of Amorphous Cellulose

The same procedures as in Production Example 15 were carried out, except that the kind of the pulverization aid was changed to OHC18EB (ethylenebis 12-hydroxystearic amide, "SLIPAX H" commercially available from Nippon Kasei Chemical Co., Ltd.), to provide an amorphous cellulose Q.

Production Example 18 of Amorphous Cellulose

The same procedures as in Production Example 15 were carried out, except that the kind of the pulverization aid was changed to PPA-Zn (zinc salt of unsubstituted phenylphosphonic acid, "PPA-Zn" commercially available from NISSAN CHEMICAL INDUSTRIES, LTD.), to provide an amorphous cellulose R.

Production Example 19 of Amorphous Cellulose

The same procedures as in Production Example 15 were carried out, except that the kind of the pulverization aid was changed to PE-MS (pentaerythritol monostearate, "EXCEPARL PE-MS" commercially available from Kao Corporation), to provide an amorphous cellulose S.

Production Example 20 of Amorphous Cellulose

The same procedures as in Production Example 15 were carried out, except that the kind of the pulverization aid was changed to (MeEO$_3$)$_2$SA (diester formed between succinic acid and triethylene glycol monomethyl ether prepared by Production Example 1 of Plasticizer given below), to provide an amorphous cellulose T.

Production Example 21 of Amorphous Cellulose

The same procedures as in Production Example 15 were carried out, except that the kind of the pulverization aid was changed to polyethylene glycol ("Polyethylene Glycol 4000," commercially available from Sigma-Aldrich, weight-average molecular weight: 4000), to provide an amorphous cellulose U.

Production Example 22 of Amorphous Cellulose

The same procedures as in Production Example 19 were carried out, except that the amount of the pulverization aid was changed from 5 g to 0.5 g, to provide an amorphous cellulose V.

Production Example 23 of Amorphous Cellulose

The same procedures as in Production Example 19 were carried out, except that the amount of the pulverization aid was changed from 5 g to 45 g, to provide an amorphous cellulose W.

Production Example 24 of Amorphous Cellulose

The same procedures as in Production Example 19 were carried out, except that the amorphous cellulose used in the tertiary pulverization was changed to the amorphous cellulose B, to provide an amorphous cellulose X.

Production Example 25 of Amorphous Cellulose

The same procedures as in Production Example 19 were carried out, except that the amorphous cellulose used in the tertiary pulverization was changed to the amorphous cellulose C, to provide an amorphous cellulose Y.

Production Example 26 of Amorphous Cellulose

The same procedures as in Production Example 20 were carried out, except that the amorphous cellulose used in the tertiary pulverization was changed to the amorphous cellulose E, to provide an amorphous cellulose Z.

Production Example 27 of Amorphous Cellulose

The same procedures as in Production Example 20 were carried out, except that the amorphous cellulose used in the tertiary pulverization was changed to the amorphous cellulose F, to provide an amorphous cellulose AA.

Production Example 28 of Amorphous Cellulose

The same procedures as in Production Example 20 were carried out, except that the amorphous cellulose used in the tertiary pulverization was changed to the amorphous cellulose G, to provide an amorphous cellulose AB.

Production Example 29 of Amorphous Cellulose

The same procedures as in Production Example 20 were carried out, except that the amorphous cellulose used in the tertiary pulverization was changed to the amorphous cellulose H, to provide an amorphous cellulose AC.

Production Example 30 of Amorphous Cellulose

The same procedures as in Production Example 20 were carried out, except that the amorphous cellulose used in the tertiary pulverization was changed to the amorphous cellulose I, to provide an amorphous cellulose AD.

Production Example 31 of Amorphous Cellulose

The same procedures as in Production Example 20 were carried out, except that the amorphous cellulose used in the tertiary pulverization was changed to the amorphous cellulose J, to provide an amorphous cellulose AE.

Production Example 32 of Amorphous Cellulose

The same procedures as in Production Example 20 were carried out, except that the amorphous cellulose used in the tertiary pulverization was changed to the amorphous cellulose K, to provide an amorphous cellulose AF.

Production Example 33 of Amorphous Cellulose

The same procedures as in Production Example 20 were carried out, except that the amorphous cellulose used in the tertiary pulverization was changed to the amorphous cellulose L, to provide an amorphous cellulose AG.

Production Example 34 of Amorphous Cellulose

The same procedures as in Production Example 20 were carried out, except that the amorphous cellulose used in the tertiary pulverization was changed to the amorphous cellulose M, to provide an amorphous cellulose AH.

Production Example 35 of Amorphous Cellulose

The same procedures as in Production Example 20 were carried out, except that the amorphous cellulose used in the tertiary pulverization was changed to the amorphous cellulose N, to provide an amorphous cellulose AI.

Production Example 36 of Amorphous Cellulose

[Rough Pulverization Treatment]
As a cellulose-containing raw material, sheet-like wood pulp ("Blue Bear Ultra Ether," commercially available from Borregard, 800 mm×600 mm×1.5 mm, crystallinity: 81%, cellulose content: 96% by weight, water content: 7.0% by weight) were applied to a sheet pelletizer ("SG(E)-220" commercially available from HORAI Co., Ltd.), to roughly pulverize the wood pulp to a size of about 4 mm×about 4 mm×about 1.5 mm.

[Drying Treatment]
The pulp obtained by the rough pulverization treatment was dried using a shelf dryer [vacuum thermostatic dryer "DRV320DA," commercially available from ADVANTEC], so as to have a water content of the pulp after drying to be 0.8% by weight.

[Secondary Pulverization]
Fifty grams of the pulp obtained by a drying treatment was subjected to a treatment (secondary pulverization treatment) for 40 minutes under the same conditions as in Production Example 4 using the same pulverizer as in Production Example 4 as a pulverizer used in the secondary pulverization. The temperature during the operation was 30° C.

After the termination of the treatment, no solid deposits of pulp or the like were found on the wall side and the bottom of the pulverizer. The pulp obtained after the secondary pulverization treatment was taken out of the pulverizer, and sieved with a sieve having a sieve opening of 75 μm. As a result, as a screen-passed product, 42.5 g (85% by weight of the amount supplied) of a product was obtained. The average particle size of the screen-passed product obtained was measured, and the crystallinity was calculated from X-ray diffraction intensities.

Next, the same procedures as in Production Example 15 were carried out, except for the product obtained after the secondary pulverization treatment and the change in the kind of a pulverization aid to $(MeEO_3)_2SA$ (diester formed between succinic acid and triethylene glycol monomethyl ether), to provide an amorphous cellulose AJ.

Production Example 37 of Amorphous Cellulose

The same procedures as in Production Example 36 were carried out, except that a drying treatment was carried out in a manner so that the pulp obtained after the rough pulverization treatment was dried to have a water content of the pulp after drying of 2.0% by weight, to provide an amorphous cellulose AK.

Here, as the crystalline cellulose, "Ceolus TG101" commercially available from ASAHI KASEI CHEMICALS CORPORATION was used.

Production Example 1 of Plasticizer

Diester Formed Between Succinic Acid and Triethylene Glycol Monomethyl Ether A 3 L flask equipped with a stirrer, a thermometer, and a dehydration tube was charged with 500 g of succinic anhydride, 2463 g of triethylene glycol monomethyl ether, and 9.5 g of paratoluenesulfonic acid monohydrate, and the components were reacted at 110° C. for 15 hours under a reduced pressure of from 4 to 10.7 kPa, while blowing nitrogen (500 mL/minute) into a space portion. The reaction mixture had an acid value of 1.6 (KOH mg/g). Twenty-seven grams of an adsorbent KYOWAAD 500SH (commercially available from Kyowa Kagaku Kogyo) was added to the reaction mixture, and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and cooled to 80° C., and the residue was filtered under a reduced pressure, to provide a diester formed between succinic acid and triethylene glycol monomethyl ether as a filtrate. The resulting diester had an acid value of 0.2 (KOH mg/g), a saponification value of 276 (KOH mg/g), a hydroxyl value of 1 or less (KOH mg/g), and a hue APHA of 200.

TABLE 1

| | Amorphous Cellulose A | Amorphous Cellulose B | Amorphous Cellulose C | Amorphous Cellulose D | Amorphous Cellulose E | Amorphous Cellulose F | Amorphous Cellulose G | Amorphous Cellulose H |
|---|---|---|---|---|---|---|---|---|
| Kind of Cellulose-Containing Raw Material | Pulp | Pulp | Pulp | Pulp | Pine Chips | Pine Chips with Cooking Treatment | Cedar Chips | Cypress Chips |
| Treated/Untreated with Shredder Treatment with Twin-Screw Extruder (Primary Pulverization) | Treated | Treated | Treated | Treated | Untreated | Untreated | Untreated | Untreated |
| Treated/Untreated | Treated | Treated | Treated | Treated | Treated | Treated | Treated | Treated |
| Shearing Rate (sec$^{-1}$) | 660 | 660 | 660 | 660 | 660 | 660 | 660 | 660 |
| Volume-Median Particle Size of Cellulose ($D_{50}$) (μm) | 120 | 120 | 120 | 120 | 105 | 103 | 101 | 108 |
| Bulk Density (kg/m$^3$) | 219 | 219 | 219 | 219 | 225 | 224 | 218 | 224 |
| Treatment with Pulverizer (Secondary Pulverization) | | | | | | | | |
| Treated/Untreated | Treated | Treated | Treated | Treated | Treated | Treated | Treated | Treated |
| Kind of Pulverizer A | Agitating Pulverizer | Agitating Pulverizer | Agitating Pulverizer | Vibration Mill | Vibration Mill | Vibration Mill | Vibration Mill | Vibration Mill |
| Material of Medium | Zirconia | Zirconia | Zirconia | Stainless Steel | Stainless Steel | Stainless Steel | Stainless Steel | Stainless Steel |
| Shape of Medium (φ: Outer Diameter) | Balls of 5 mmφ | Balls of 5 mmφ | Balls of 5 mmφ | Rods of 30 mmφ | Rods of 30 mmφ | Rods of 30 mmφ | Rods of 30 mmφ | Rods of 30 mmφ |
| Amount of Raw Material Supplied (g) | 50 | 50 | 50 | 50 | 50 | 50 | 50 | 50 |
| Treatment Time (hr) | 3 | 0.75 | 15 | 1 | 1.25 | 1.25 | 1.25 | 1.25 |
| Evaluation | | | | | | | | |
| Cellulose I Crystallinity (%) | 0 | 45 | 20 | 0 | 0 | 0 | 0 | 0 |
| Absence or Presence of Solid Deposit After Pulverization | Absence | Absence | Absence | Absence | Absence | Absence | Absence | Absence |
| Weight of 75 μm-Sieve Passed Particles Based on Amount Supplied to the Pulverizer (% by Weight) | 90 | 65 | 78 | 60 | 85 | 83 | 84 | 84 |
| Volume-Median Particle Size of Cellulose ($D_{50}$) (μm) | 30 | 30 | 30 | 40 | 32 | 31 | 33 | 32 |

TABLE 2

| | Amorphous Cellulose I | Amorphous Cellulose J | Amorphous Cellulose K | Amorphous Cellulose L | Amorphous Cellulose M | Amorphous Cellulose N | Crystalline Cellulose |
|---|---|---|---|---|---|---|---|
| Kind of Cellulose-Containing Raw Material | Newspaper | Magazine | Corrugated Cardboard | Deinked Pulp | Rice Plant Straw | Rice Hulls | Pulp |
| Treated/Untreated with Shredder Treatment with Twin-Screw Extruder (Primary Pulverization) | Treated | Treated | Treated | Treated | Untreated | Untreated | Untreated |
| Treated/Untreated | Treated | Treated | Treated | Treated | Treated | Treated | Untreated |
| Shearing Rate (sec$^{-1}$) | 660 | 660 | 660 | 660 | 660 | 660 | — |

TABLE 2-continued

|  | Amorphous Cellulose I | Amorphous Cellulose J | Amorphous Cellulose K | Amorphous Cellulose L | Amorphous Cellulose M | Amorphous Cellulose N | Crystalline Cellulose |
|---|---|---|---|---|---|---|---|
| Volume-Median Particle Size of Cellulose ($D_{50}$) (μm) | 61 | 72 | 93 | 75 | 82 | 85 | — |
| Bulk Density (kg/m$^3$) | 303 | 431 | 216 | 310 | 339 | 380 | — |
| Treatment with Pulverizer (Secondary Pulverization) | | | | | | | |
| Treated/Untreated | Treated | Treated | Treated | Treated | Treated | Treated | Untreated |
| Kind of Pulverizer A | Vibration Mill | Vibration Mill | Vibration Mill | Vibration Mill | Vibration Mill | Vibration Mill | — |
| Material of Medium | Stainless Steel | Stainless Steel | Stainless Steel | Stainless Steel | Stainless Steel | Stainless Steel | — |
| Shape of Medium (φ: Outer Diameter) | Rods of 30 mmφ | Rods of 30 mmφ | Rods of 30 mmφ | Rods of 30 mmφ | Rods of 30 mmφ | Rods of 30 mmφ | — |
| Amount of Raw Material Supplied (g) | 50 | 50 | 50 | 50 | 50 | 50 | — |
| Treatment Time (hr) | 1.25 | 1.25 | 1.25 | 1.25 | 1.25 | 1.25 | — |
| Evaluation | | | | | | | |
| Cellulose I Crystallinity (%) | 0 | 0 | 0 | 0 | 0 | 0 | 82 |
| Absence or Presence of Solid Deposit After Pulverization | Absence | Absence | Absence | Absence | Absence | Absence | — |
| Weight of 75 μm-Sieve Passed Particles Based on Amount Supplied to the Pulverizer (% by Weight) | 87 | 83 | 85 | 89 | 84 | 71 | — |
| Volume-Median Particle Size of Cellulose ($D_{50}$) (μm) | 35 | 32 | 30 | 31 | 29 | 34 | 30 |

Note)
Crystalline Cellulose is Ceolus TG-101, commercially available from ASAHI KASEI CHEMICALS CORPORATION.

TABLE 3

|  | Amorphous Cellulose O | Amorphous Cellulose P | Amorphous Cellulose Q | Amorphous Cellulose R | Amorphous Cellulose S | Amorphous Cellulose T |
|---|---|---|---|---|---|---|
| Raw Material | Amorphous Cellulose A | Amorphous Cellulose A | Amorphous Cellulose A | Amorphous Cellulose A | Amorphous Cellulose A | Amorphous Cellulose A |
| Pulverization Aid | | | | | | |
| Kind | Stearyl Alcohol | Sodium Stearate | OHC18EB | PPA-Zn | PE-MS | $(MeEO_3)_2SA$ |
| Amount (Parts by Weight) | 10 | 10 | 10 | 10 | 10 | 10 |
| Pulverizer B | | | | | | |
| Kind of Pulverizer | Vibration Mill | Vibration Mill | Vibration Mill | Vibration Mill | Vibration Mill | Vibration Mill |
| Material of Medium | Stainless Steel | Stainless Steel | Stainless Steel | Stainless Steel | Stainless Steel | Stainless Steel |
| Shape of Medium (φ: Outer Diameter) | Rods of 30 mmφ | Rods of 30 mmφ | Rods of 30 mmφ | Rods of 30 mmφ | Rods of 30 mmφ | Rods of 30 mmφ |
| Treatment Time (hr) | 0.25 | 0.25 | 0.25 | 0.25 | 0.25 | 0.25 |
| Evaluation | | | | | | |
| Volume-Median Particle Size of Cellulose ($D_{50}$) (μm) | 9.7 | 13 | 8.5 | 9.2 | 8 | 6 |
| Cellulose I Crystallinity (%) | 0 | 0 | 0 | 0 | 0 | 0 |

|  | Amorphous Cellulose U | Amorphous Cellulose V | Amorphous Cellulose W | Amorphous Cellulose X | Amorphous Cellulose Y |
|---|---|---|---|---|---|
| Raw Material | Amorphous Cellulose A | Amorphous Cellulose A | Amorphous Cellulose A | Amorphous Cellulose B | Amorphous Cellulose C |
| Pulverization Aid | | | | | |
| Kind | Polyethylene Glycol | PE-MS | PE-MS | PE-MS | PE-MS |
| Amount (Parts by Weight) | 10 | 1 | 90 | 10 | 10 |
| Pulverizer B | | | | | |
| Kind of Pulverizer | Vibration Mill | Vibration Mill | Vibration Mill | Vibration Mill | Vibration Mill |

TABLE 3-continued

|  | | | | | |
|---|---|---|---|---|---|
| Material of Medium | Stainless Steel | Stainless Steel | Stainless Steel | Stainless Steel | Stainless Steel |
| Shape of Medium (φ: Outer Diameter) | Rods of 30 mmφ | Rods of 30 mmφ | Rods of 30 mmφ | Rods of 30 mmφ | Rods of 30 mmφ |
| Treatment Time (hr) | 0.25 | 0.25 | 0.25 | 0.25 | 0.25 |
| Evaluation | | | | | |
| Volume-Median Particle Size of Cellulose ($D_{50}$) (μm) | 17 | 13 | 14 | 14 | 15 |
| Cellulose I Crystallinity (%) | 0 | 0 | 0 | 43 | 19 |

*Amount of the pulverization aid is expressed by the amount used (parts by weight), based on 100 parts by weight of the amorphous cellulose used in the tertiary pulverization.

TABLE 4

|  | Amorphous Cellulose Z | Amorphous Cellulose AA | Amorphous Cellulose AB | Amorphous Cellulose AC | Amorphous Cellulose AD |
|---|---|---|---|---|---|
| Raw Material | Amorphous Cellulose E | Amorphous Cellulose F | Amorphous Cellulose G | Amorphous Cellulose H | Amorphous Cellulose I |
| Pulverization Aid | | | | | |
| Kind | $(MeEO_3)_2SA$ | $(MeEO_3)_2SA$ | $(MeEO_3)_2SA$ | $(MeEO_3)_2SA$ | $(MeEO_3)_2SA$ |
| Amount (Parts by Weight) | 10 | 10 | 10 | 10 | 10 |
| Pulverizer B | | | | | |
| Kind of Pulverizer | Vibration Mill | Vibration Mill | Vibration Mill | Vibration Mill | Vibration Mill |
| Material of Medium | Stainless Steel | Stainless Steel | Stainless Steel | Stainless Steel | Stainless Steel |
| Shape of Medium (φ: Outer Diameter) | Rods of 30 mmφ | Rods of 30 mmφ | Rods of 30 mmφ | Rods of 30 mmφ | Rods of 30 mmφ |
| Treatment Time (hr) | 0.25 | 0.25 | 0.25 | 0.25 | 0.25 |
| Evaluation | | | | | |
| Volume-Median Particle Size of Cellulose ($D_{50}$) (μm) | 13 | 15 | 14 | 15 | 14 |
| Cellulose I Crystallinity (%) | 0 | 0 | 0 | 0 | 0 |

|  | Amorphous Cellulose AE | Amorphous Cellulose AF | Amorphous Cellulose AG | Amorphous Cellulose AH | Amorphous Cellulose AI |
|---|---|---|---|---|---|
| Raw Material | Amorphous Cellulose J | Amorphous Cellulose K | Amorphous Cellulose L | Amorphous Cellulose M | Amorphous Cellulose N |
| Pulverization Aid | | | | | |
| Kind | $(MeEO_3)_2SA$ | $(MeEO_3)_2SA$ | $(MeEO_3)_2SA$ | $(MeEO_3)_2SA$ | $(MeEO_3)_2SA$ |
| Amount (Parts by Weight) | 10 | 10 | 10 | 10 | 10 |
| Pulverizer B | | | | | |
| Kind of Pulverizer | Vibration Mill | Vibration Mill | Vibration Mill | Vibration Mill | Vibration Mill |
| Material of Medium | Stainless Steel | Stainless Steel | Stainless Steel | Stainless Steel | Stainless Steel |
| Shape of Medium (φ: Outer Diameter) | Rods of 30 mmφ | Rods of 30 mmφ | Rods of 30 mmφ | Rods of 30 mmφ | Rods of 30 mmφ |
| Treatment Time (hr) | 0.25 | 0.25 | 0.25 | 0.25 | 0.25 |
| Evaluation | | | | | |
| Volume-Median Particle Size of Cellulose ($D_{50}$) (μm) | 13 | 14 | 13 | 15 | 14 |
| Cellulose I Crystallinity (%) | 0 | 0 | 0 | 0 | 0 |

*Amount of the pulverization aid is expressed by the amount used (parts by weight), based on 100 parts by weight of the amorphous cellulose used in the tertiary pulverization.

TABLE 5

| | Amorphous Cellulose T | Amorphous Cellulose AJ | Amorphous Cellulose AK |
|---|---|---|---|
| Cellulose-Containing Raw Material | | | |
| Kind of Raw Material | Pulp | Pulp | Pulp |
| Size (mm × mm × mm)[1] | 800 × 600 × 1.5 | 800 × 600 × 1.5 | 800 × 600 × 1.5 |
| Cellulose Content (% by weight) | 96 | 96 | 96 |
| Cellulose I Crystallinity (%) | 81 | 81 | 81 |
| Water Content (% by weight) | 7.0 | 7.0 | 7.0 |
| Bulk Density (kg/m$^3$) | 200 | 200 | 200 |
| Rough Pulverization Treatment | | | |
| Cutting Machine | Shredder | Sheet Pelletizer | Sheet Pelletizer |
| Size (mm × mm × mm)[1] | 10 × 5 × 1.5 | 4 × 4 × 1.5 | 4 × 4 × 1.5 |
| Drying Treatment | | | |
| Treated/Untreated | Untreated | Treated | Treated |
| Water Content Before Treatment | — | 7.0 | 7.0 |
| Dryer | — | Shelf Dryer | Shelf Dryer |
| Treatment with Twin-Screw Extruder (Primary Pulverization) | | | |
| Treated/Untreated | Treated | Untreated | Untreated |
| Shearing Rate (sec$^{-1}$) | 660 | — | — |
| Volume-Median Particle Size of Cellulose ($D_{50}$) (μm) | 120 | — | — |
| Bulk Density (kg/m$^3$) | 219 | — | — |
| Raw Material Before Secondary Pulverization | | | |
| Weight of 4.0 mm-Sieve Passed Particles Based on 50 g of Raw Material (% by weight)[2] | 0.2 | 98 | 98 |
| Water Content (% by weight) | 6.8 | 0.8 | 2.0 |
| Treatment with Pulverizer (Secondary Pulverization) | | | |
| Treated/Untreated | Treated | Treated | Treated |
| Kind of Pulverizer A | Agitating Pulverizer | Vibration Mill | Vibration Mill |
| Material of Medium | Zirconia | Stainless Steel | Stainless Steel |
| Shape of Medium (φ: Outer Diameter) | Balls of 5 mmφ | Rods of 30 mmφ | Rods of 30 mmφ |
| Amount of Raw Material Supplied (g) | 50 | 50 | 50 |
| Treatment Time (hr) | 3 | 0.67 | 0.67 |
| Evaluations of Secondary Pulverization | | | |
| Cellulose I Crystallinity (%) | 0 | 0 | 0 |
| Absence or Presence of Solid Deposit After Pulverization | Absence | Absence | Absence |
| Weight of 75 μm-Sieve Passed Particles Based on Amount Supplied to Pulverizer (% by weight) | 90 | 85 | 80 |
| Volume-Median Particle Size of Cellulose ($D_{50}$) (μm) | 30 | 30 | 32 |
| Treatment with Pulverizer (Tertiary Pulverization) | | | |
| Treated/Untreated | Treated | Treated | Treated |
| Kind of Pulverizer B | Vibration Mill | Vibration Mill | Vibration Mill |
| Material of Medium | Stainless Steel | Stainless Steel | Stainless Steel |
| Shape of Medium (φ: Outer Diameter) | Rods of 30 mmφ | Rods of 30 mmφ | Rods of 30 mmφ |
| Kind of Pulverization Aid | (MeEO$_3$)$_2$SA | (MeEO$_3$)$_2$SA | (MeEO$_3$)$_2$SA |
| Amount (Parts by Weight)[3] | 10 | 10 | 10 |
| Treatment Time (hr) | 0.25 | 0.25 | 0.25 |
| Evaluations of Tertiary Pulverization | | | |
| Volume-Median Particle Size of Cellulose ($D_{50}$) (μm) | 6 | 6.1 | 6.2 |
| Cellulose I Crystallinity (%) | 0 | 0 | 0 |

[1] A value measured with calipers (average of 10).
[2] "Weight of 4.0 mm-Sieve Passed Particles (% by weight)" means a proportion of the cellulose-containing raw material passing through a sieve having a sieve opening of 4000 μm, but not passing through a sieve opening of 3600 μm.
[3] Amount of the pulverization aid is expressed by the amount used (parts by weight), based on 100 parts by weight of the amorphous cellulose used in the tertiary pulverization.

Examples 1 to 8 and Comparative Examples 1 to 3

Biodegradable Resin Compositions without Containing Plasticizer

A polylactic acid resin, an organic crystal nucleating agent, a hydrolysis inhibitor and a filler (amorphous cellulose or crystalline cellulose) shown in Table 6 were used as raw materials, and the components were melt-kneaded with a twin-screw extruder (PCM-45, commercially available from Ikegai Tekko) at 190° C., and a melt-kneaded mixture was strand-cut, to provide pellets of each of the polylactic acid resin compositions A to K (Examples 1 to 8 and Comparative Examples 1 to 3). Here, the resulting pellets were dried at 70° C. under a reduced pressure for one day, so as to have a water content of 1% by weight or less.

Examples 9 to 49 and Comparative Examples 4 to 7

Biodegradable Resin Compositions Containing Plasticizer

A polylactic acid resin, a plasticizer, an organic crystal nucleating agent, a hydrolysis inhibitor and a filler (amorphous cellulose or crystalline cellulose) shown in Table 7, 8, 9 or 10 were used as raw materials, and the same procedures as in Example 1 were carried out, to provide pellets of each of the polylactic acid resin compositions L to Z, AA to AZ, and BA to BD (Examples 9 to 49 and Comparative Examples 4 to 7). Here, the resulting pellets were dried at 70° C. under a reduced pressure for one day, so as to have a water content of 1% by weight or less.

Here, the raw materials in Tables 6 to 10 are follows.

[Polylactic Acid Resin]
LACEA H-400: commercially available from Mitsui Chemicals, Inc., melting point: 166° C., glass transition temperature: 62° C.
[Plasticizer]
(MeEO$_3$)$_2$SA: Diester formed between succinic acid and triethylene glycol monomethyl ether prepared by Production Example 1 of Plasticizer, average molecular weight: 410
[Organic Crystal Nucleating Agent]
OHC18EB: Ethylenebis-12-hydroxystearic amide (SLIPAX H, commercially available from Nippon Kasei Chemical Co., Ltd., melting point: 145° C.)
PPA-Zn: Zinc salt of unsubstituted phenylphosphonic acid (commercially available from NISSAN CHEMICAL INDUSTRIES, LTD., no melting point)
[Hydrolysis Inhibitor]
PCI: Polycarbodiimide compound (CARBODILITE LA-1, commercially available from Nisshinbo)

TABLE 6

| Raw Materials of Polylactic Acid Resin Composition (Parts by Weight) | Examples | | | | | | | | Comparative Examples | | |
|---|---|---|---|---|---|---|---|---|---|---|---|
| | 1 (A) | 2 (B) | 3 (C) | 4 (D) | 5 (E) | 6 (F) | 7 (G) | 8 (H) | 1 (I) | 2 (J) | 3 (K) |
| Polylactic Acid Resin | | | | | | | | | | | |
| LACEA H-400 | 100 | 100 | 100 | 100 | 100 | 100 | 100 | 100 | 100 | 100 | 100 |
| Plasticizer | | | | | | | | | | | |
| (MeEO$_3$)$_2$SA | — | — | — | — | — | — | — | — | — | — | — |
| Organic Crystal Nucleating Agent | | | | | | | | | | | |
| OHC18EB | 0.5 | 0.5 | 0.5 | 0.5 | 0.5 | 0.5 | 0.5 | 0.5 | 0.5 | 0.5 | 0.5 |
| Hydrolysis Inhibitor | | | | | | | | | | | |
| PCI | 0.5 | 0.5 | 0.5 | 0.5 | 0.5 | 0.5 | 0.5 | 0.5 | 0.5 | 0.5 | 0.5 |
| Filler | | | | | | | | | | | |
| Amorphous Cellulose A | 10 | 30 | — | — | — | — | — | — | — | — | — |
| Amorphous Cellulose B | — | — | — | — | — | — | — | — | — | — | — |
| Amorphous Cellulose C | — | — | 10 | 30 | — | — | — | — | — | — | — |
| Amorphous Cellulose D | — | — | — | — | — | — | — | — | — | — | — |
| Amorphous Cellulose E | — | — | — | — | 30 | — | — | — | — | — | — |
| Amorphous Cellulose F | — | — | — | — | — | — | — | — | — | — | — |
| Amorphous Cellulose G | — | — | — | — | — | — | — | — | — | — | — |
| Amorphous Cellulose H | — | — | — | — | — | — | — | — | — | — | — |
| Amorphous Cellulose I | — | — | — | — | — | — | — | — | — | — | — |
| Amorphous Cellulose J | — | — | — | — | — | — | — | — | — | — | — |
| Amorphous Cellulose K | — | — | — | — | — | — | — | — | — | — | — |
| Amorphous Cellulose L | — | — | — | — | — | 30 | — | — | — | — | — |
| Amorphous Cellulose M | — | — | — | — | — | — | — | — | — | — | — |
| Amorphous Cellulose N | — | — | — | — | — | — | — | — | — | — | — |
| Amorphous Cellulose O | — | — | — | — | — | — | — | — | — | — | — |
| Amorphous Cellulose P | — | — | — | — | — | — | — | — | — | — | — |
| Amorphous Cellulose Q | — | — | — | — | — | — | — | — | — | — | — |
| Amorphous Cellulose R | — | — | — | — | — | — | — | — | — | — | — |
| Amorphous Cellulose S | — | — | — | — | — | — | 10 | 30 | — | — | — |
| Amorphous Cellulose T | — | — | — | — | — | — | — | — | — | — | — |
| Amorphous Cellulose U | — | — | — | — | — | — | — | — | — | — | — |
| Amorphous Cellulose V | — | — | — | — | — | — | — | — | — | — | — |
| Amorphous Cellulose W | — | — | — | — | — | — | — | — | — | — | — |
| Amorphous Cellulose X | — | — | — | — | — | — | — | — | — | — | — |
| Amorphous Cellulose Y | — | — | — | — | — | — | — | — | — | — | — |
| Amorphous Cellulose Z | — | — | — | — | — | — | — | — | — | — | — |
| Amorphous Cellulose AA | — | — | — | — | — | — | — | — | — | — | — |
| Amorphous Cellulose AB | — | — | — | — | — | — | — | — | — | — | — |
| Amorphous Cellulose AC | — | — | — | — | — | — | — | — | — | — | — |
| Amorphous Cellulose AD | — | — | — | — | — | — | — | — | — | — | — |
| Amorphous Cellulose AE | — | — | — | — | — | — | — | — | — | — | — |
| Amorphous Cellulose AF | — | — | — | — | — | — | — | — | — | — | — |
| Amorphous Cellulose AG | — | — | — | — | — | — | — | — | — | — | — |
| Amorphous Cellulose AH | — | — | — | — | — | — | — | — | — | — | — |
| Amorphous Cellulose AI | — | — | — | — | — | — | — | — | — | — | — |
| Crystalline Cellulose | — | — | — | — | — | — | — | — | 10 | 30 | — |

Note)
Each amount used is expressed by parts by weight, based on 100 parts by weight of the polylactic acid resin.

TABLE 7

| Raw Materials of Polylactic Acid Resin Composition (Parts by Weight) | Examples | | | | | | | | | | |
|---|---|---|---|---|---|---|---|---|---|---|---|
| | 9 (L) | 10 (M) | 11 (N) | 12 (O) | 13 (P) | 14 (Q) | 15 (R) | 16 (S) | 17 (T) | 18 (U) | 19 (V) |
| Polylactic Acid Resin | | | | | | | | | | | |
| LACEA H-400 | 100 | 100 | 100 | 100 | 100 | 100 | 100 | 100 | 100 | 100 | 100 |
| Plasticizer | | | | | | | | | | | |
| $(MeEO_3)_2SA$ | 10 | 10 | 10 | 10 | 10 | 10 | 10 | 10 | 10 | 10 | 10 |
| Organic Crystal Nucleating Agent | | | | | | | | | | | |
| OHC18EB | 0.5 | 0.5 | 0.5 | 0.5 | 0.5 | 0.5 | 0.5 | 0.5 | 0.5 | 0.5 | 0.5 |
| PPA-Zn | — | — | — | — | — | — | — | 0.5 | — | — | — |
| Hydrolysis Inhibitor | | | | | | | | | | | |
| PCI | 0.5 | 0.5 | 0.5 | 0.5 | 0.5 | 0.5 | 0.5 | 0.5 | 0.5 | 0.5 | 0.5 |
| Filler | | | | | | | | | | | |
| Amorphous Cellulose A | 10 | 30 | — | — | — | 50 | 100 | 30 | — | — | — |
| Amorphous Cellulose B | — | — | 10 | — | — | — | — | — | — | — | — |
| Amorphous Cellulose C | — | — | — | 10 | 30 | — | — | — | — | — | — |
| Amorphous Cellulose D | — | — | — | — | — | — | — | — | 30 | — | — |
| Amorphous Cellulose E | — | — | — | — | — | — | — | — | — | 30 | — |
| Amorphous Cellulose F | — | — | — | — | — | — | — | — | — | — | 30 |
| Amorphous Cellulose G | — | — | — | — | — | — | — | — | — | — | — |
| Amorphous Cellulose H | — | — | — | — | — | — | — | — | — | — | — |
| Amorphous Cellulose I | — | — | — | — | — | — | — | — | — | — | — |
| Amorphous Cellulose J | — | — | — | — | — | — | — | — | — | — | — |
| Amorphous Cellulose K | — | — | — | — | — | — | — | — | — | — | — |
| Amorphous Cellulose L | — | — | — | — | — | — | — | — | — | — | — |
| Amorphous Cellulose M | — | — | — | — | — | — | — | — | — | — | — |
| Amorphous Cellulose N | — | — | — | — | — | — | — | — | — | — | — |
| Amorphous Cellulose O | — | — | — | — | — | — | — | — | — | — | — |
| Amorphous Cellulose P | — | — | — | — | — | — | — | — | — | — | — |
| Amorphous Cellulose Q | — | — | — | — | — | — | — | — | — | — | — |
| Amorphous Cellulose R | — | — | — | — | — | — | — | — | — | — | — |
| Amorphous Cellulose S | — | — | — | — | — | — | — | — | — | — | — |
| Amorphous Cellulose T | — | — | — | — | — | — | — | — | — | — | — |
| Amorphous Cellulose U | — | — | — | — | — | — | — | — | — | — | — |
| Amorphous Cellulose V | — | — | — | — | — | — | — | — | — | — | — |
| Amorphous Cellulose W | — | — | — | — | — | — | — | — | — | — | — |
| Amorphous Cellulose X | — | — | — | — | — | — | — | — | — | — | — |
| Amorphous Cellulose Y | — | — | — | — | — | — | — | — | — | — | — |
| Amorphous Cellulose Z | — | — | — | — | — | — | — | — | — | — | — |
| Amorphous Cellulose AA | — | — | — | — | — | — | — | — | — | — | — |
| Amorphous Cellulose AB | — | — | — | — | — | — | — | — | — | — | — |
| Amorphous Cellulose AC | — | — | — | — | — | — | — | — | — | — | — |
| Amorphous Cellulose AD | — | — | — | — | — | — | — | — | — | — | — |
| Amorphous Cellulose AE | — | — | — | — | — | — | — | — | — | — | — |
| Amorphous Cellulose AF | — | — | — | — | — | — | — | — | — | — | — |
| Amorphous Cellulose AG | — | — | — | — | — | — | — | — | — | — | — |
| Amorphous Cellulose AH | — | — | — | — | — | — | — | — | — | — | — |
| Amorphous Cellulose AI | — | — | — | — | — | — | — | — | — | — | — |
| Crystalline Cellulose | — | — | — | — | — | — | — | — | — | — | — |

Note)
Each amount used is expressed by parts by weight, based on 100 parts by weight of the polylactic acid resin.

TABLE 8

| Raw Materials of Polylactic Acid Resin Composition (Parts by Weight) | Examples | | | | | | | | | | |
|---|---|---|---|---|---|---|---|---|---|---|---|
| | 20 (W) | 21 (X) | 22 (Y) | 23 (Z) | 24 (AA) | 25 (AB) | 26 (AC) | 27 (AD) | 28 (AE) | 29 (AF) | 30 (AG) |
| Polylactic Acid Resin | | | | | | | | | | | |
| LACEA H-400 | 100 | 100 | 100 | 100 | 100 | 100 | 100 | 100 | 100 | 100 | 100 |
| Plasticizer | | | | | | | | | | | |
| $(MeEO_3)_2SA$ | 10 | 10 | 10 | 10 | 10 | 10 | 10 | 10 | 10 | 10 | 10 |
| Organic Crystal Nucleating Agent | | | | | | | | | | | |
| OHC18EB | 0.5 | 0.5 | 0.5 | 0.5 | 0.5 | 0.5 | 0.5 | 0.5 | 0.5 | 0.5 | 0.5 |
| PPA-Zn | — | — | — | — | — | — | — | — | — | — | — |

TABLE 8-continued

| Raw Materials of Polylactic Acid Resin Composition (Parts by Weight) | Examples | | | | | | | | | | |
|---|---|---|---|---|---|---|---|---|---|---|---|
| | 20 (W) | 21 (X) | 22 (Y) | 23 (Z) | 24 (AA) | 25 (AB) | 26 (AC) | 27 (AD) | 28 (AE) | 29 (AF) | 30 (AG) |
| Hydrolysis Inhibitor | | | | | | | | | | | |
| PCI | 0.5 | 0.5 | 0.5 | 0.5 | 0.5 | 0.5 | 0.5 | 0.5 | 0.5 | 0.5 | 0.5 |
| Filler | | | | | | | | | | | |
| Amorphous Cellulose A | — | — | — | — | — | — | — | — | — | — | — |
| Amorphous Cellulose B | — | — | — | — | — | — | — | — | — | — | — |
| Amorphous Cellulose C | — | — | — | — | — | — | — | — | — | — | — |
| Amorphous Cellulose D | — | — | — | — | — | — | — | — | — | — | — |
| Amorphous Cellulose E | — | — | — | — | — | — | — | — | — | — | — |
| Amorphous Cellulose F | — | — | — | — | — | — | — | — | — | — | — |
| Amorphous Cellulose G | 30 | — | — | — | — | — | — | — | — | — | — |
| Amorphous Cellulose H | — | 30 | — | — | — | — | — | — | — | — | — |
| Amorphous Cellulose I | — | — | 30 | — | — | — | — | — | — | — | — |
| Amorphous Cellulose J | — | — | — | 30 | — | — | — | — | — | — | — |
| Amorphous Cellulose K | — | — | — | — | 30 | — | — | — | — | — | — |
| Amorphous Cellulose L | — | — | — | — | — | 30 | 100 | — | — | — | — |
| Amorphous Cellulose M | — | — | — | — | — | — | — | 30 | — | — | — |
| Amorphous Cellulose N | — | — | — | — | — | — | — | — | 30 | — | — |
| Amorphous Cellulose O | — | — | — | — | — | — | — | — | — | 30 | — |
| Amorphous Cellulose P | — | — | — | — | — | — | — | — | — | — | 30 |
| Amorphous Cellulose Q | — | — | — | — | — | — | — | — | — | — | — |
| Amorphous Cellulose R | — | — | — | — | — | — | — | — | — | — | — |
| Amorphous Cellulose S | — | — | — | — | — | — | — | — | — | — | — |
| Amorphous Cellulose T | — | — | — | — | — | — | — | — | — | — | — |
| Amorphous Cellulose U | — | — | — | — | — | — | — | — | — | — | — |
| Amorphous Cellulose V | — | — | — | — | — | — | — | — | — | — | — |
| Amorphous Cellulose W | — | — | — | — | — | — | — | — | — | — | — |
| Amorphous Cellulose X | — | — | — | — | — | — | — | — | — | — | — |
| Amorphous Cellulose Y | — | — | — | — | — | — | — | — | — | — | — |
| Amorphous Cellulose Z | — | — | — | — | — | — | — | — | — | — | — |
| Amorphous Cellulose AA | — | — | — | — | — | — | — | — | — | — | — |
| Amorphous Cellulose AB | — | — | — | — | — | — | — | — | — | — | — |
| Amorphous Cellulose AC | — | — | — | — | — | — | — | — | — | — | — |
| Amorphous Cellulose AD | — | — | — | — | — | — | — | — | — | — | — |
| Amorphous Cellulose AE | — | — | — | — | — | — | — | — | — | — | — |
| Amorphous Cellulose AF | — | — | — | — | — | — | — | — | — | — | — |
| Amorphous Cellulose AG | — | — | — | — | — | — | — | — | — | — | — |
| Amorphous Cellulose AH | — | — | — | — | — | — | — | — | — | — | — |
| Amorphous Cellulose AI | — | — | — | — | — | — | — | — | — | — | — |
| Crystalline Cellulose | — | — | — | — | — | — | — | — | — | — | — |

Note)
Each amount used is expressed by parts by weight, based on 100 parts by weight of the polylactic acid resin.

TABLE 9

| Raw Materials of Polylactic Acid Resin Composition (Parts by Weight) | Examples | | | | | | | | | | |
|---|---|---|---|---|---|---|---|---|---|---|---|
| | 31 (AH) | 32 (AI) | 33 (AJ) | 34 (AK) | 35 (AL) | 36 (AM) | 37 (AN) | 38 (AO) | 39 (AP) | 40 (AQ) | 41 (AR) |
| Polylactic Acid Resin | | | | | | | | | | | |
| LACEA H-400 | 100 | 100 | 100 | 100 | 100 | 100 | 100 | 100 | 100 | 100 | 100 |
| Plasticizer | | | | | | | | | | | |
| $(MeEO_3)_2SA$ | 10 | 10 | 10 | 10 | 10 | 10 | 10 | 10 | 10 | 10 | 10 |
| Organic Crystal Nucleating Agent | | | | | | | | | | | |
| OHC18EB | 0.5 | 0.5 | 0.5 | 0.5 | 0.5 | 0.5 | 0.5 | 0.5 | 0.5 | 0.5 | 0.5 |
| PPA-Zn | — | — | — | — | — | — | — | — | — | — | — |
| Hydrolysis Inhibitor | | | | | | | | | | | |
| PCI | 0.5 | 0.5 | 0.5 | 0.5 | 0.5 | 0.5 | 0.5 | 0.5 | 0.5 | 0.5 | 0.5 |
| Filler | | | | | | | | | | | |
| Amorphous Cellulose A | — | — | — | — | — | — | — | — | — | — | — |
| Amorphous Cellulose B | — | — | — | — | — | — | — | — | — | — | — |
| Amorphous Cellulose C | — | — | — | — | — | — | — | — | — | — | — |
| Amorphous Cellulose D | — | — | — | — | — | — | — | — | — | — | — |
| Amorphous Cellulose E | — | — | — | — | — | — | — | — | — | — | — |

TABLE 9-continued

| Raw Materials of Polylactic Acid Resin Composition (Parts by Weight) | Examples | | | | | | | | | | |
|---|---|---|---|---|---|---|---|---|---|---|---|
| | 31 (AH) | 32 (AI) | 33 (AJ) | 34 (AK) | 35 (AL) | 36 (AM) | 37 (AN) | 38 (AO) | 39 (AP) | 40 (AQ) | 41 (AR) |
| Amorphous Cellulose F | — | — | — | — | — | — | — | — | — | — | — |
| Amorphous Cellulose G | — | — | — | — | — | — | — | — | — | — | — |
| Amorphous Cellulose H | — | — | — | — | — | — | — | — | — | — | — |
| Amorphous Cellulose I | — | — | — | — | — | — | — | — | — | — | — |
| Amorphous Cellulose J | — | — | — | — | — | — | — | — | — | — | — |
| Amorphous Cellulose K | — | — | — | — | — | — | — | — | — | — | — |
| Amorphous Cellulose L | — | — | — | — | — | — | — | — | — | — | — |
| Amorphous Cellulose M | — | — | — | — | — | — | — | — | — | — | — |
| Amorphous Cellulose N | — | — | — | — | — | — | — | — | — | — | — |
| Amorphous Cellulose O | — | — | — | — | — | — | — | — | — | — | — |
| Amorphous Cellulose P | — | — | — | — | — | — | — | — | — | — | — |
| Amorphous Cellulose Q | 30 | — | — | — | — | — | — | — | — | — | — |
| Amorphous Cellulose R | — | 30 | — | — | — | — | — | — | — | — | — |
| Amorphous Cellulose S | — | — | 30 | — | — | — | — | — | — | — | — |
| Amorphous Cellulose T | — | — | — | 30 | — | — | — | — | — | — | — |
| Amorphous Cellulose U | — | — | — | — | 30 | — | — | — | — | — | — |
| Amorphous Cellulose V | — | — | — | — | — | 30 | — | — | — | — | — |
| Amorphous Cellulose W | — | — | — | — | — | — | 30 | — | — | — | — |
| Amorphous Cellulose X | — | — | — | — | — | — | — | 30 | — | — | — |
| Amorphous Cellulose Y | — | — | — | — | — | — | — | — | 30 | — | — |
| Amorphous Cellulose Z | — | — | — | — | — | — | — | — | — | 30 | — |
| Amorphous Cellulose AA | — | — | — | — | — | — | — | — | — | — | 30 |
| Amorphous Cellulose AB | — | — | — | — | — | — | — | — | — | — | — |
| Amorphous Cellulose AC | — | — | — | — | — | — | — | — | — | — | — |
| Amorphous Cellulose AD | — | — | — | — | — | — | — | — | — | — | — |
| Amorphous Cellulose AE | — | — | — | — | — | — | — | — | — | — | — |
| Amorphous Cellulose AF | — | — | — | — | — | — | — | — | — | — | — |
| Amorphous Cellulose AG | — | — | — | — | — | — | — | — | — | — | — |
| Amorphous Cellulose AH | — | — | — | — | — | — | — | — | — | — | — |
| Amorphous Cellulose AI | — | — | — | — | — | — | — | — | — | — | — |
| Crystalline Cellulose | — | — | — | — | — | — | — | — | — | — | — |

Note)
Each amount used is expressed by parts by weight, based on 100 parts by weight of the polylactic acid resin.

TABLE 10

| Raw Materials of Polylactic Acid Resin Composition (Parts by Weight) | Examples | | | | | | | | Comparative Examples | | | |
|---|---|---|---|---|---|---|---|---|---|---|---|---|
| | 42 (AS) | 43 (AT) | 44 (AU) | 45 (AV) | 46 (AW) | 47 (AX) | 48 (AY) | 49 (AZ) | 4 (BA) | 5 (BB) | 6 (BC) | 7 (BD) |
| Polylactic Acid Resin | | | | | | | | | | | | |
| LACEA H-400 | 100 | 100 | 100 | 100 | 100 | 100 | 100 | 100 | 100 | 100 | 100 | 100 |
| Plasticizer | | | | | | | | | | | | |
| (MeEO₃)₂SA | 10 | 10 | 10 | 10 | 10 | 10 | 10 | 10 | 10 | 10 | 10 | 10 |
| Organic Crystal Nucleating Agent | | | | | | | | | | | | |
| OHC18EB | 0.5 | 0.5 | 0.5 | 0.5 | 0.5 | 0.5 | 0.5 | 0.5 | 0.5 | 0.5 | 0.5 | 0.5 |
| PPA-Zn | — | — | — | — | — | — | — | — | — | — | — | — |
| Hydrolysis Inhibitor | | | | | | | | | | | | |
| PCI | 0.5 | 0.5 | 0.5 | 0.5 | 0.5 | 0.5 | 0.5 | 0.5 | 0.5 | 0.5 | 0.5 | 0.5 |
| Filler | | | | | | | | | | | | |
| Amorphous Cellulose A | — | — | — | — | — | — | — | — | — | — | — | — |
| Amorphous Cellulose B | — | — | — | — | — | — | — | — | — | — | — | — |
| Amorphous Cellulose C | — | — | — | — | — | — | — | — | — | — | — | — |
| Amorphous Cellulose D | — | — | — | — | — | — | — | — | — | — | — | — |
| Amorphous Cellulose E | — | — | — | — | — | — | — | — | — | — | — | — |
| Amorphous Cellulose F | — | — | — | — | — | — | — | — | — | — | — | — |
| Amorphous Cellulose G | — | — | — | — | — | — | — | — | — | — | — | — |
| Amorphous Cellulose H | — | — | — | — | — | — | — | — | — | — | — | — |
| Amorphous Cellulose I | — | — | — | — | — | — | — | — | — | — | — | — |
| Amorphous Cellulose J | — | — | — | — | — | — | — | — | — | — | — | — |
| Amorphous Cellulose K | — | — | — | — | — | — | — | — | — | — | — | — |
| Amorphous Cellulose L | — | — | — | — | — | — | — | — | — | — | — | — |
| Amorphous Cellulose M | — | — | — | — | — | — | — | — | — | — | — | — |
| Amorphous Cellulose N | — | — | — | — | — | — | — | — | — | — | — | — |
| Amorphous Cellulose O | — | — | — | — | — | — | — | — | — | — | — | — |

TABLE 10-continued

| Raw Materials of Polylactic Acid Resin Composition (Parts by Weight) | Examples | | | | | | | | Comparative Examples | | | |
|---|---|---|---|---|---|---|---|---|---|---|---|---|
| | 42 (AS) | 43 (AT) | 44 (AU) | 45 (AV) | 46 (AW) | 47 (AX) | 48 (AY) | 49 (AZ) | 4 (BA) | 5 (BB) | 6 (BC) | 7 (BD) |
| Amorphous Cellulose P | — | — | — | — | — | — | — | — | — | — | — | — |
| Amorphous Cellulose Q | — | — | — | — | — | — | — | — | — | — | — | — |
| Amorphous Cellulose R | — | — | — | — | — | — | — | — | — | — | — | — |
| Amorphous Cellulose S | — | — | — | — | — | — | — | — | — | — | — | — |
| Amorphous Cellulose T | — | — | — | — | — | — | — | — | — | — | — | — |
| Amorphous Cellulose U | — | — | — | — | — | — | — | — | — | — | — | — |
| Amorphous Cellulose V | — | — | — | — | — | — | — | — | — | — | — | — |
| Amorphous Cellulose W | — | — | — | — | — | — | — | — | — | — | — | — |
| Amorphous Cellulose X | — | — | — | — | — | — | — | — | — | — | — | — |
| Amorphous Cellulose Y | — | — | — | — | — | — | — | — | — | — | — | — |
| Amorphous Cellulose Z | — | — | — | — | — | — | — | — | — | — | — | — |
| Amorphous Cellulose AA | — | — | — | — | — | — | — | — | — | — | — | — |
| Amorphous Cellulose AB | 30 | — | — | — | — | — | — | — | — | — | — | — |
| Amorphous Cellulose AC | — | 30 | — | — | — | — | — | — | — | — | — | — |
| Amorphous Cellulose AD | — | — | 30 | — | — | — | — | — | — | — | — | — |
| Amorphous Cellulose AE | — | — | — | 30 | — | — | — | — | — | — | — | — |
| Amorphous Cellulose AF | — | — | — | — | 30 | — | — | — | — | — | — | — |
| Amorphous Cellulose AG | — | — | — | — | — | 30 | — | — | — | — | — | — |
| Amorphous Cellulose AH | — | — | — | — | — | — | 30 | — | — | — | — | — |
| Amorphous Cellulose AI | — | — | — | — | — | — | — | 30 | — | — | — | — |
| Crystalline Cellulose | — | — | — | — | — | — | — | — | 10 | 30 | 100 | — |

Note)
Each amount used is expressed by parts by weight, based on 100 parts by weight of the polylactic acid resin.

Examples 50 to 98 and Comparative Examples 8 to 14 Biodegradable Resin Molded Article Next, the pellets of Examples 1 to 49 and Comparative Examples 1 to 7 were injection-molded with an injection molding machine (J75E-D, commercially available from The Japan Steel Works, Ltd.) of which cylinder temperature was adjusted to 200° C., and molded into test pieces [rectangular test pieces (125 mm×12 mm×6 mm and 63 mm×12 mm×5 mm)] at a die temperature of 80° C. and a molding time of 10 minutes, to provide biodegradable resin molded articles of Examples 50 to 98 and Comparative Examples 8 to 14.

The physical properties of the molded articles of Examples 50 to 98 and Comparative Examples 8 to 14 were examined in accordance with the methods of the following Test Examples 1 and 2. The results are shown in Tables 11 and 12.

Test Example 1

Strength (Flexural Strength, Flexural Modulus), Flexibility (Flexural Strain at Break)

Rectangular test pieces (125 mm×12 mm×6 mm) were subjected to flexural test with TENSILON (TENSILON Tensile Tester RTC-1210A, commercially available from Orientec Co., LTD.) as prescribed in JIS K7203, setting its cross-head speed to 3 mm/min, and flexural strength, flexural modulus, and flexural strain at break were obtained. In all these properties, the higher the numerical values, the more excellent the strength or flexibility. Here, as to the flexural strain at break, those test pieces that did not break when a load was applied within the measurement range were evaluated as "not broken."

Test Example 2

Impact Resistance

Izod impact strength (J/m) was measured for rectangular test pieces (63 mm×12 mm×5 mm) using an impact tester (Model 863, commercially available from Ueshima Seisakusho Co., Ltd.) as prescribed in JIS K7110. The higher the Izod impact strength (Jhn), the more excellent the impact resistance.

TABLE 11

| | | Physical Properties of Molded Article | | | |
|---|---|---|---|---|---|
| | | Strength | | Flexibility Flexural | Impact Resistance [Izod |
| | Polylactic Acid Resin Composition | Flexural Strength (MPa) | Flexural Modulus (GPa) | Strain at Break (%) | Impact Strength (J/m)] |
| Example 50 | A | 105 | 4.3 | 7.0 | 42 |
| Example 51 | B | 113 | 4.7 | 6.4 | 38 |
| Example 52 | C | 107 | 4.4 | 6.0 | 40 |
| Example 53 | D | 114 | 4.9 | 5.9 | 37 |
| Example 54 | E | 110 | 4.5 | 6.1 | 37 |
| Example 55 | F | 108 | 4.5 | 6.2 | 36 |
| Example 56 | G | 103 | 4.2 | 7.5 | 47 |
| Example 57 | H | 112 | 4.6 | 6.8 | 44 |
| Comparative Example 8 | I | 113 | 4.6 | 3.7 | 38 |
| Comparative Example 9 | J | 120 | 5.1 | 3.3 | 35 |
| Comparative Example 10 | K | 90 | 3.4 | 4.3 | 38 |

TABLE 12

| | | Physical Properties of Molded Article | | | |
|---|---|---|---|---|---|
| | Polylactic Acid Resin Composition | Strength | | Flexibility Flexural | Impact Resistance [Izod |
| | | Flexural Strength (MPa) | Flexural Modulus (GPa) | Strain at Break (%) | Impact Strength (J/m)] |
| Example 58 | L | 45 | 1.6 | Not Broken | 56 |
| Example 59 | M | 55 | 2.3 | Not Broken | 48 |

TABLE 12-continued

| | Polylactic Acid Resin Composition | Strength Flexural Strength (MPa) | Strength Flexural Modulus (GPa) | Flexibility Flexural Strain at Break (%) | Impact Resistance [Izod Impact Strength (J/m)] |
|---|---|---|---|---|---|
| Example 60 | N | 48 | 1.7 | Not Broken | 51 |
| Example 61 | O | 46 | 1.6 | Not Broken | 53 |
| Example 62 | P | 56 | 2.3 | Not Broken | 47 |
| Example 63 | Q | 61 | 2.7 | 17.5 | 44 |
| Example 64 | R | 95 | 6.1 | 2.7 | 39 |
| Example 65 | S | 56 | 2.3 | Not Broken | 47 |
| Example 66 | T | 57 | 2.3 | Not Broken | 46 |
| Example 67 | U | 54 | 2.1 | Not Broken | 44 |
| Example 68 | V | 54 | 2.1 | Not Broken | 47 |
| Example 69 | W | 49 | 2.2 | Not Broken | 44 |
| Example 70 | X | 48 | 2.2 | Not Broken | 44 |
| Example 71 | Y | 50 | 2.0 | Not Broken | 45 |
| Example 72 | Z | 48 | 2.0 | Not Broken | 46 |
| Example 73 | AA | 48 | 2.0 | Not Broken | 45 |
| Example 74 | AB | 53 | 2.1 | Not Broken | 45 |
| Example 75 | AC | 93 | 5.7 | 2.4 | 36 |
| Example 76 | AD | 47 | 2.0 | Not Broken | 44 |
| Example 77 | AE | 47 | 2.0 | Not Broken | 44 |
| Example 78 | AF | 54 | 2.2 | Not Broken | 63 |
| Example 79 | AG | 55 | 2.3 | Not Broken | 57 |
| Example 80 | AH | 57 | 2.3 | Not Broken | 63 |
| Example 81 | AI | 59 | 2.3 | Not Broken | 62 |
| Example 82 | AJ | 56 | 2.3 | Not Broken | 64 |
| Example 83 | AK | 57 | 2.3 | Not Broken | 65 |
| Example 84 | AL | 55 | 2.2 | Not Broken | 55 |
| Example 85 | AM | 55 | 2.2 | Not Broken | 57 |
| Example 86 | AN | 53 | 2.0 | Not Broken | 56 |
| Example 87 | AO | 53 | 2.1 | Not Broken | 57 |
| Example 88 | AP | 55 | 2.2 | Not Broken | 56 |
| Example 89 | AQ | 53 | 2.0 | Not Broken | 50 |
| Example 90 | AR | 53 | 2.0 | Not Broken | 58 |
| Example 91 | AS | 48 | 2.1 | Not Broken | 48 |
| Example 92 | AT | 48 | 2.0 | Not Broken | 50 |
| Example 93 | AU | 49 | 1.9 | Not Broken | 55 |
| Example 94 | AV | 47 | 2.0 | Not Broken | 57 |
| Example 95 | AW | 48 | 1.9 | Not Broken | 51 |
| Example 96 | AX | 51 | 2.0 | Not Broken | 54 |
| Example 97 | AY | 47 | 1.9 | Not Broken | 49 |
| Example 98 | AZ | 47 | 1.9 | Not Broken | 48 |
| Comparative Example 11 | BA | 50 | 2.0 | 14.9 | 46 |
| Comparative Example 12 | BB | 59 | 2.4 | 14.1 | 44 |
| Comparative Example 13 | BC | 95 | 6.2 | 1.2 | 19 |
| Comparative Example 14 | BD | 35 | 1.2 | Not Broken | 80 |

It is clear from the results of Tables 11 and 12 that the biodegradable resin molded articles of the present invention (Examples 50 to 98) show high flexural strength, high flexural modulus, and high flexural strain at break. Even in cases where an amorphous cellulose having a crystallinity of less than 50% is contained as described above, it is suggested that the molded articles can satisfy both the strength and the flexibility.

Examples 34, 99, and 100

The same procedures as in Example 1 were carried out using a polylactic acid resin, a plasticizer, an organic crystal nucleating agent, a hydrolysis inhibitor and a filler (amorphous cellulose) shown in Table 13, to provide the pellets of each of the polylactic acid resin compositions AK, BE, and BF (Examples 34, 99, and 100). Here, the resulting pellets were dried at 70° C. under a reduced pressure for one day, so as to have a water content of 1% or less.

Next, the resulting pellets were injection-molded with an injection-molding machine (J75E-D commercially available from The Japan Steel Works, Ltd.) of which cylinder temperature was adjusted to 200° C., and molded into test pieces [rectangular test pieces (125 mm×12 mm×6 mm)] at a die temperature of 80° C. and a molding time of 10 minutes, to provide a biodegradable resin molded article.

The physical properties of the resulting molded articles were examined in accordance with the methods of Test Examples 1 and 2 mentioned above and Test Example 3 detailed below. The results are shown in Table 13.

Test Example 3

Durability

The resulting molded article was placed in a thermohygrostatic machine (Platina Series PSL-2, commercially available from Tabye Espec) at 60° C. and 70% RH, and allowed to stand for 24 hours. Each of the molded articles (125 mm×12 mm×6 mm) after allowing to stand was subjected to a flexural test using TENSILON (TENSILON Tensile Tester RTC-1210A, commercially available from Orientec Co., LTD.) as prescribed in JIS K7203, setting its crosshead speed to 3 mm/min, and a holding percentage of flexural strength was obtained. The holding percentage of flexural strength shows a holding percentage of physical properties when the flexural strength before the durability test is defined as 100%. The higher the holding percentage of the physical properties, the more excellent the durability.

TABLE 13

| Raw Materials of Polylactic Acid Resin Composition (Parts by Weight) | Examples | | |
|---|---|---|---|
| | 34 (AK) | 99 (BE) | 100 (BF) |
| Polylactic Acid Resin | | | |
| LACEA H-400 | 100 | 100 | 100 |
| Plasticizer | | | |
| (MeEO$_3$)$_2$SA | 10 | 10 | 10 |
| Organic Crystal Nucleating Agent | | | |
| OHC18EB | 0.5 | 0.5 | 0.5 |
| Hydrolysis Inhibitor | | | |
| PCI | 0.5 | 0.5 | 0.5 |
| Filler | | | |
| Amorphous Cellulose T | 30 | — | — |
| Amorphous Cellulose AJ | — | 30 | — |
| Amorphous Cellulose AK | — | — | 30 |
| Physical Properties | | | |
| Strength | | | |
| Flexural Strength (MPa) | 57 | 58 | 58 |
| Flexural Modulus (GPa) | 2.3 | 2.3 | 2.3 |
| Flexibility | | | |
| Flexural Strain at Break (%) | Not Broken | Not Broken | Not Broken |
| Impact Resistance [Izod Impact Strength (J/m)] | 65 | 70 | 68 |
| Durability | | | |
| Holding Percentage of Flexural Strength (%) | 83 | 92 | 90 |

Note)
Each amount used is expressed by parts by weight, based on 100 parts by weight of the polylactic acid resin.

It is suggested from the results of Table 13 that since the amorphous cellulose having a crystallinity of less than 50% is contained, the resulting molded article can satisfy both strength and flexibility, and further that in a case where an amorphous cellulose is obtained by forming a cellulose-containing raw material having a low water content into amorphous phases, the resulting molded article is also excellent in durability.

Industrial Applicability

The biodegradable resin composition of the present invention can be suitably used for various industrial applications, such as daily sundries, household electric appliance parts, and automobile parts.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for producing a biodegradable resin composition, comprising a biodegradable resin, an organic crystal nucleating agent, and a cellulose having a crystallinity of less than 50%, wherein the organic crystal nucleating agent is contained in an amount of from 0.1 to 5 parts by weight, based on 100 parts by weight of the biodegradable resin, said method comprising the steps of:
   (I) subjecting a cellulose-containing raw material containing water in an amount of 20% by weight or less to a pulverization treatment, to provide a cellulose having a crystallinity of less than 50%; wherein the cellulose having a crystallinity of less than 50% is obtained by treating a cellulose-containing raw material with a pulverizer A, wherein the cellulose-containing raw material comprises a cellulose having a crystallinity of 50% or more, and has a bulk density of from 100 to 500 kg/m$^3$, and an average particle size of from 0.01 to 1.0 mm, and contains a cellulose in an amount of 20% by weight or more of a residue component obtained by removing water from the raw material; and
   (II) melt-kneading the cellulose having a crystallinity of less than 50% obtained in the step (I), a biodegradable resin containing a polylactic resin, and an organic crystal nucleating agent, wherein the cellulose is contained in an amount of from 5 to 300 parts by weight based on 100 parts by weight of the biodegradable resin and has an average particle size of 6 to 150 µm.

2. The method for producing a biodegradable resin according to claim 1, wherein the cellulose having a crystallinity of less than 50% is obtained by treating a cellulose-containing raw material with a pulverizer A, wherein the cellulose-containing raw material comprises a cellulose having a crystallinity of 50% or more, and an average particle size of exceeding 1.0 mm and 50 mm or less and a water content of 4.5% by weight or less, and contains a cellulose in an amount of 20% by weight or more of a residue component obtained by removing water from the raw material.

3. The method for producing a biodegradable resin according to claim 1, wherein the cellulose having a crystallinity of less than 50% is obtained by further subjecting the cellulose obtained by treatment with the pulverizer A to a pulverization treatment with a pulverizer B, wherein a pulverization aid is added in an amount of from 0.1 to 100 parts by weight, to 100 parts by weight of the cellulose obtained by treatment with the pulverizer A.

4. The method for producing a biodegradable resin according to claim 3, wherein the pulverization aid is at least one member selected from the group consisting of alcohols, aliphatic amides, aromatic carboxylic acid amides, rosin amides, metal salts of fatty acids, metal salts of dialkyl esters of aromatic sulfonic acids, metal salts of phenylphosphonic acids, metal salts of phosphoric esters, metal salts of rosin acids, fatty acid esters, carbohydrazides, N-substituted ureas, salts of melamine compounds, urasils, and polyethers.

5. The method for producing a biodegradable resin composition according to claim 1, wherein the step (I) further comprises the step of adding a pulverization aid in an amount of from 0.1 to 100 parts by weight, based on 100 parts by weight of the cellulose obtained by subjecting a cellulose-containing raw material containing water in an amount of 4.5% by weight or less to a pulverization treatment, and subjecting the raw material mixture to a pulverization treatment.

6. The method for producing a biodegradable resin composition according to claim 1, wherein the cellulose having a crystallinity of less than 50% has a crystallinity of 30% or less.

* * * * *